US009422957B2

(12) United States Patent
Dinh

(10) Patent No.: US 9,422,957 B2
(45) Date of Patent: Aug. 23, 2016

(54) PANEL CLAMP

(75) Inventor: Cong Thanh Dinh, Collierville, TN (US)

(73) Assignee: Thomas & Betts International LLCDE (US)

( * ) Notice: Subject to any disclaimer, the term of this patent is extended or adjusted under 35 U.S.C. 154(b) by 1229 days.

(21) Appl. No.: 13/352,430

(22) Filed: Jan. 18, 2012

(65) Prior Publication Data
US 2012/0192399 A1 Aug. 2, 2012

Related U.S. Application Data

(60) Provisional application No. 61/438,286, filed on Feb. 1, 2011.

(51) Int. Cl.
*F16B 5/00* (2006.01)
*F16B 37/04* (2006.01)
(Continued)

(52) U.S. Cl.
CPC ............. *F16B 5/0072* (2013.01); *F16B 37/045* (2013.01); *F24J 2/5258* (2013.01); *F16B 2/065* (2013.01); *F24J 2002/522* (2013.01); *Y02E 10/47* (2013.01); *Y10T 29/49826* (2015.01)

(58) Field of Classification Search
CPC ............. B25B 1/10; B25B 5/02; B25B 5/06; B25B 3/00; B25B 5/163; B25B 9/00; B25B 27/00; H01L 23/12; B23P 11/00; F16B 2/12; F16B 2/065
USPC ........ 52/173.3, 745.21, 698; 269/43, 45, 246; 248/316.4, 230.2, 237, 220.21; 411/104, 112, 85
See application file for complete search history.

(56) References Cited

U.S. PATENT DOCUMENTS 3,432,197 A * 3/1969 Graves ...................... F16B 1/00
248/499
3,470,526 A * 9/1969 Joly .......................... H01R 4/34
439/723

(Continued)

FOREIGN PATENT DOCUMENTS

CA 2 486 445 A1 11/2003
CA 2 516 067 A1 9/2004
(Continued)

OTHER PUBLICATIONS

Bonenberger, Paul R.. (2005). First Snap-Fit Handbook—Creating and Managing Attachments for Plastic Parts (2nd Edition)—3.3.2 Cantilever Beam Locks. Hanser Publishers.*

*Primary Examiner* — Monica Carter
*Assistant Examiner* — Mahdi H Nejad
(74) *Attorney, Agent, or Firm* — Taft Stettinius & Hollister LLP

(57) ABSTRACT

A clamp includes an upper portion, lower portion, screw and nut. The upper portion may include first and second rectangular shaped members, a first projection extending from the first and second members, and a first central opening located between the first and second members. The lower portion may include third and fourth rectangular shaped members, a second projection extending from the third and fourth members, and a second central opening located between the third and fourth members. The screw may extend from the upper portion through the first and second central openings. The nut may be integrally connected to the lower portion and includes threads to receive corresponding threads from the screw. Lower surfaces of the first and second members and upper surfaces of the third and fourth members define an opening located adjacent the first and second projections in which a component to be clamped is placed.

17 Claims, 20 Drawing Sheets

(51) Int. Cl.
*F24J 2/52* (2006.01)
*F16B 2/06* (2006.01)

(56) References Cited

U.S. PATENT DOCUMENTS

| | | | | |
|---|---|---|---|---|
| 3,712,606 A * | 1/1973 | Cole | ................... | B25B 5/106 269/239 |
| 4,145,103 A * | 3/1979 | Knowles | ............ | H01R 12/675 439/400 |
| 4,188,083 A * | 2/1980 | Knowles | ............ | H01R 12/675 439/405 |
| 4,412,714 A * | 11/1983 | Morningstar | ........ | H01R 12/675 439/352 |
| 4,702,447 A | 10/1987 | Westwood, III | | |
| 4,708,554 A * | 11/1987 | Howard | ................... | E04C 3/06 411/437 |
| 4,799,639 A | 1/1989 | Riley | | |
| 4,854,016 A | 8/1989 | Rice | | |
| 4,897,041 A * | 1/1990 | Heiney | ................. | H01R 23/661 439/404 |
| 4,901,963 A | 2/1990 | Yoder | | |
| 4,901,964 A | 2/1990 | McConnell | | |
| 4,948,313 A * | 8/1990 | Zankovich | ............ | F16B 37/045 411/103 |
| 4,957,402 A * | 9/1990 | Klein | ................... | F16B 37/045 411/166 |
| 5,161,762 A | 11/1992 | Stewart et al. | | |
| 5,209,619 A * | 5/1993 | Rinderer | ............... | F26B 37/045 411/553 |
| 5,369,851 A | 12/1994 | Merkel | | |
| 5,478,041 A | 12/1995 | Mayne | | |
| 5,628,598 A * | 5/1997 | Hofle | ................... | F16B 37/045 411/104 |
| 5,639,259 A * | 6/1997 | Wellinsky | ............ | H01R 23/661 439/470 |
| 5,678,383 A * | 10/1997 | Danielewicz | ............. | E04D 3/06 52/235 |
| 5,704,816 A * | 1/1998 | Polidori | ................... | H01R 4/44 403/391 |
| 5,863,021 A | 1/1999 | Nichols | | |
| 6,322,388 B1 * | 11/2001 | Akio | ................. | H01R 13/5812 439/459 |
| 6,370,828 B1 * | 4/2002 | Genschorek | ........... | F24J 2/5205 52/173.3 |
| 6,672,018 B2 | 1/2004 | Shingleton | | |
| 6,932,307 B2 | 8/2005 | Guennec et al. | | |
| 6,959,517 B2 * | 11/2005 | Poddany | ............... | E06B 1/6015 52/173.3 |
| 7,410,136 B1 | 8/2008 | Lombardi | | |
| 7,413,151 B2 | 8/2008 | Wu | | |
| 7,600,349 B2 | 10/2009 | Liebendorfer | | |
| 7,634,875 B2 * | 12/2009 | Genschorek | ................. | 52/173.3 |
| 7,674,002 B1 | 3/2010 | Wang | | |
| 7,758,011 B2 * | 7/2010 | Haddock | ............. | E04F 13/0821 248/500 |
| 7,874,774 B2 * | 1/2011 | Peterson | ............... | B60P 7/0815 410/104 |
| 8,156,697 B2 * | 4/2012 | Miros | ................... | F24J 2/5205 126/623 |
| 8,191,320 B2 * | 6/2012 | Mittan | ................... | F24J 2/5205 16/252 |
| 8,277,157 B2 * | 10/2012 | Parsons | ................ | B61D 45/001 410/104 |
| 8,505,864 B1 * | 8/2013 | Taylor | ................... | F24J 2/5258 248/226.12 |
| 8,557,081 B2 * | 10/2013 | Sha | ........................ | F24J 2/5207 136/244 |
| 8,683,761 B2 * | 4/2014 | Danning | ................. | H02S 20/23 136/251 |
| 8,839,573 B2 * | 9/2014 | Cusson | ................. | F24J 2/5232 248/231.81 |
| 8,875,453 B2 * | 11/2014 | Kanczuzewski | .... | H01L 31/0422 136/244 |
| 8,984,818 B2 * | 3/2015 | McPheeters | ........... | F24J 2/5205 52/173.3 |
| 2003/0070368 A1 * | 4/2003 | Shingleton | ............. | F24J 2/5205 52/173.3 |
| 2006/0086382 A1 * | 4/2006 | Plaisted | ................. | F24J 2/5207 136/244 |
| 2008/0194153 A1 * | 8/2008 | De France | ........... | H01R 4/4872 439/822 |
| 2009/0000220 A1 * | 1/2009 | Lenox | .................... | F24J 2/5211 52/173.1 |
| 2009/0232616 A1 * | 9/2009 | Sekreta | ................... | F16B 35/06 411/107 |
| 2009/0250580 A1 * | 10/2009 | Strizki | ................... | F24J 2/5207 248/309.1 |
| 2010/0275549 A1 * | 11/2010 | Bruce | ..................... | F24J 2/5205 52/698 |
| 2010/0276558 A1 * | 11/2010 | Faust | ..................... | F24J 2/5205 248/222.14 |
| 2011/0100434 A1 * | 5/2011 | Van Walraven | ........ | F24J 2/5205 136/251 |
| 2011/0179606 A1 * | 7/2011 | Magno, Jr. | ............. | F24J 2/5258 24/457 |
| 2011/0214365 A1 * | 9/2011 | Aftanas | ................... | F24J 2/5258 52/173.3 |
| 2011/0259721 A1 * | 10/2011 | Hoffman | ................ | H01H 23/04 200/339 |
| 2011/0260027 A1 * | 10/2011 | Farnham, Jr. | .......... | F24J 2/5207 248/309.1 |
| 2011/0261511 A1 * | 10/2011 | Alderson | ................ | H01H 13/86 361/679.01 |
| 2012/0085394 A1 * | 4/2012 | McPheeters | ........... | F24J 2/5205 136/251 |
| 2012/0192399 A1 * | 8/2012 | Dinh | ..................... | F16B 5/0072 29/428 |
| 2012/0193310 A1 * | 8/2012 | Fluhrer | .................. | F24J 2/5203 211/41.1 |
| 2012/0248271 A1 * | 10/2012 | Zeilenga | ................ | H02S 20/00 248/231.41 |
| 2014/0010616 A1 * | 1/2014 | Meine | ....................... | F16B 2/12 411/190 |
| 2014/0041706 A1 * | 2/2014 | Haddock | ................. | F24J 2/5258 136/244 |
| 2014/0042286 A1 * | 2/2014 | Jaffari | ..................... | F16B 2/065 248/316.4 |
| 2014/0175244 A1 * | 6/2014 | West | ...................... | F24J 2/5205 248/316.7 |
| 2014/0290717 A1 * | 10/2014 | Chiu | ....................... | H02S 20/23 136/251 |
| 2014/0298657 A1 * | 10/2014 | Kim | ....................... | F24J 2/5252 29/897 |
| 2014/0361135 A1 * | 12/2014 | Moore | .................. | H02S 20/00 248/316.7 |
| 2015/0101655 A1 * | 4/2015 | Schuit | .................... | F16B 2/065 136/251 |
| 2015/0102194 A1 * | 4/2015 | Liu | ........................ | F24J 2/5258 248/316.7 |
| 2015/0184896 A1 * | 7/2015 | Lippert | .................. | F24J 2/5243 211/41.1 |
| 2015/0233410 A1 * | 8/2015 | Parthibhan | ........... | F16B 37/046 411/85 |
| 2015/0274217 A1 * | 10/2015 | Colombo | ................ | F16B 5/065 403/14 |
| 2016/0069592 A1 * | 3/2016 | Giraudo | ................. | H02S 20/23 126/704 |

FOREIGN PATENT DOCUMENTS

| | | |
|---|---|---|
| CA | 2 654 764 A1 | 11/2007 |
| GB | 870722 | 6/1961 |
| WO | 2007/069304 A1 | 6/2007 |
| WO | 2009/086150 A1 | 7/2009 |
| WO | WO2009091238 * | 7/2009 |
| WO | WO2009091238 A1 * | 7/2009 |

* cited by examiner

PANEL CLAMP

RELATED APPLICATION

This application claims priority under 35 U.S.C. §119 based on U.S. Provisional Patent Application No. 61/438,286, filed Feb. 1, 2011, the disclosure of which is hereby incorporated herein by reference.

BACKGROUND INFORMATION

Support structures, such as those used to support a large number of panels, and clamping mechanisms used in conjunction with the support structures typically include several components that are coupled to each other via conventional hardware connections (e.g., bolts, nuts, washers, etc.). One drawback with such support structures and clamping mechanisms is that it is often difficult to secure the clamp to the support structure. Another problem with conventional clamping mechanisms is that the clearances associated with installing components to be secured by the clamps are often small. Such problems make installation of the components difficult and time consuming.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments described herein provide a clamp that may be used in combination with a support or framing structure (e.g., a strut) to support and secure a number of panels, such as solar panels. The clamp may include cushioned surfaces that allow a frameless panel to be clamped without damaging the panel. In an exemplary embodiment, the clamp may be pre-installed in a framing structure/system prior to installation of the panel. In addition, in one exemplary embodiment, the clamp may include a rotatable head that may be rotated to facilitate installation of the panel.

Figure 1A:
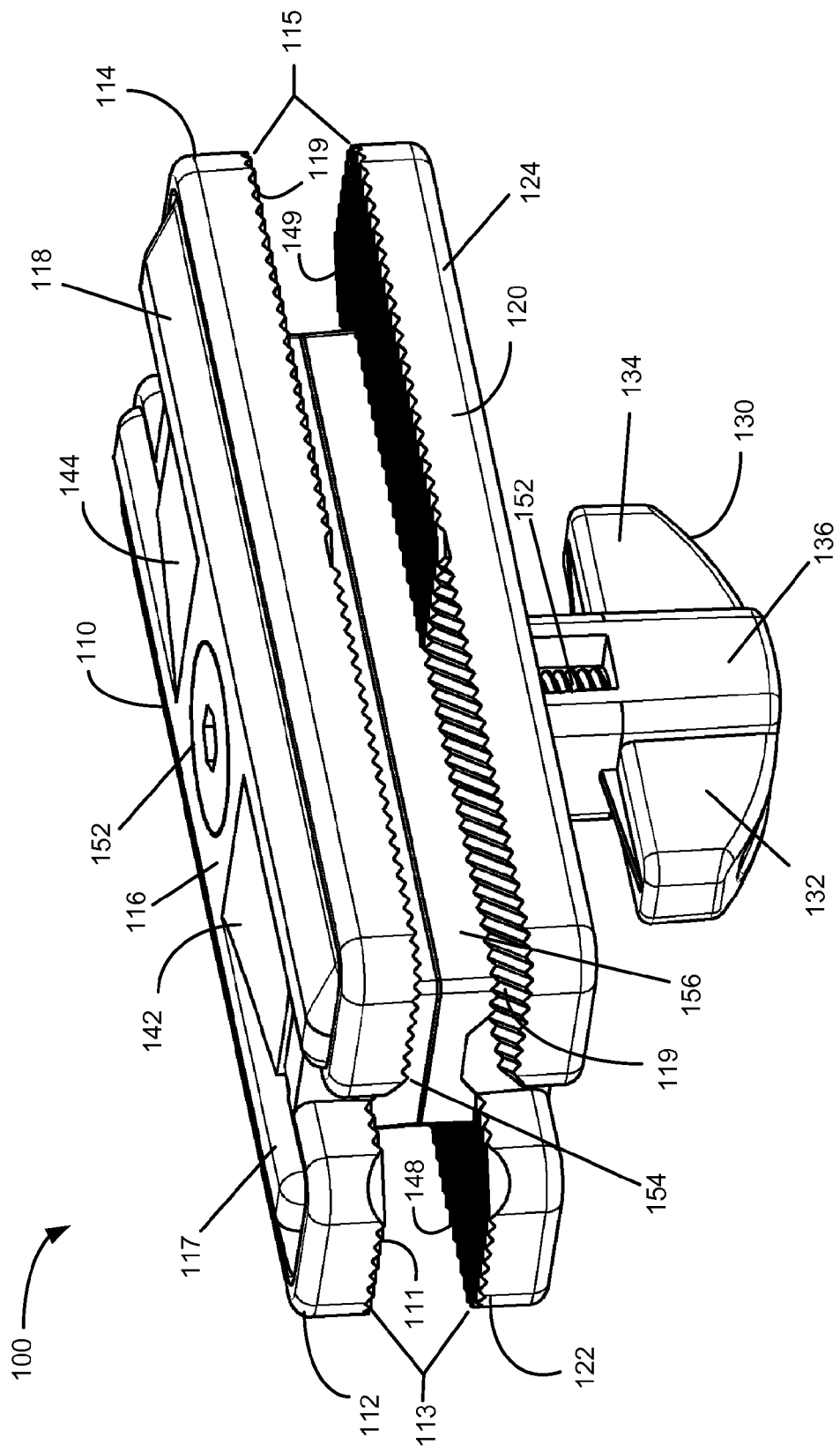
FIGS. 1A and 1B are isometric views of a clamp consistent with an exemplary embodiment.

FIG. 1A is an isometric view of an exemplary clamp 100 consistent with embodiments described herein. Referring to FIG. 1A, clamp 100 includes upper portion 110, lower portion 120 and nut 130. Upper portion 110 and lower portion 120 may together define openings in which a panel, such as a solar panel is inserted and clamped. Upper portion 110 includes generally rectangular shaped members 112 and 114 connected by middle portion 116. Similarly, lower portion 120 includes generally rectangular shaped members 122 and 124 connected by a middle portion (not shown in FIG. 1A) The lower surface of member 112 and the upper surface of member 122 define an opening or area, labeled 113 in FIG. 1A, in which a portion of a panel (e.g., a solar panel) may be inserted and clamped. Similarly, the lower surface of member 114 and the upper surface of member 124 define an opening or area, labeled 115 in FIG. 1A, in which a portion of another panel may be inserted and clamped, as described in more detail below.

As illustrated in FIG. 1A, member 112 includes a raised portion 117 that has a rectangular shaped top portion and a sloped portion located adjacent the top portion. Similarly, member 114 has a raised portion 118 that has a rectangular shaped top portion and a sloped portion located adjacent the top portion. As further illustrated in FIG. 1A, middle portion 116 includes two surfaces 142 and 144 that slope downwardly in a direction away from the center of middle portion 116. Members 112 and 114 also include rounded end portions, as illustrated in FIG. 1A. The lower surface of members 112 and 114, labeled 111 and 119, respectively, may include a combination of ridged/serrated surfaces and/or flat, cushioned surfaces.

For example, some or all of surfaces 111 and 119 may include rubber or some other resilient or cushioned material for holding a panel (e.g., a solar panel) that may not include a frame. The cushioning may prevent damage to the panel when the panel is clamped. In other instances, some portions of surfaces 111 and 119 may include ridged surfaces for holding a frame of the panel. Similarly, the upper surfaces of members 122 and 124, labeled 148 and 149, respectively, may include cushioned or padded surfaces on all or a portion of members 122 and 124 for holding a panel. For example, in one implementation, the lower surfaces 148 and 149 may include a cushioned, rubber surface.

Rectangular shaped members 154 and 156 extend from upper portion 110 and lower portion 120, respectively, and may include openings to allow screw 152 to pass through. For example, each of members 154 and 156 may be hollow or have a central bore/opening. Screw 152, also referred to herein as bolt 152, may extend through an opening in upper portion 110, including member 154, and lower portion 120, including member 156, where it is received by nut 130. The sides of members 154 and 156 may define a minimum height or distance between members 112/114 of upper portion 110 and members 122/124 of lower portion. For example, in one implementation, the combined height of members 154 and 156 approximately corresponds to slightly less than a thickness or height of a solar panel which will be held by clamp 100.

Nut 130 may include side portions 132 and 134 and a central portion 136. Central portion 136 may include a threaded opening or bore to receive corresponding threads of screw 152. Nut 130 may be secured to a frame or channel structure and may provide an upward force when screw 152 is tightened. For example, in one implementation, nut 130 may be integral with bottom portion 120 and may provide an upward clamping force when screw 152 is tightened to hold a solar panel in place, as described in more detail below. For example, a panel may be placed between members 114 and 124. As screw 152 is tightened, member 114 may lower onto the panel and nut 130 may provide an upward clamping force to help secure the panel, as described in detail below.

In an exemplary implementation, the components illustrated in FIG. 1A may be fabricated out of metal, such as steel (e.g., galvanized steel), aluminum or some other metal. In other implementations, all or some of the components illustrated in FIG. 1A may be fabricated using other materials, such as plastic or composite materials.

Figure 1B:
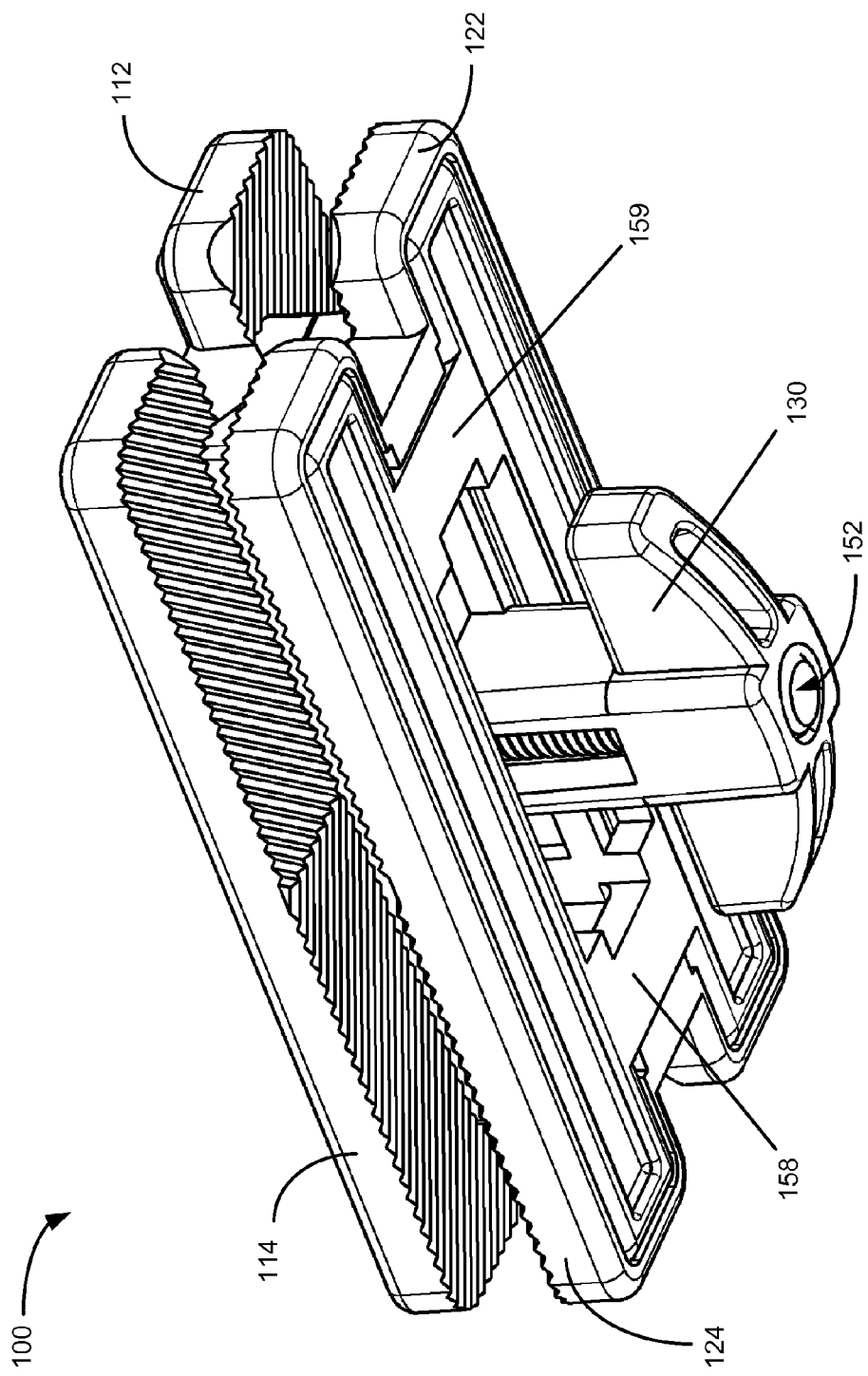

FIG. 1B illustrates clamp 100 from a lower perspective view. Referring to FIG. 1B, members 158 and 159 connect members 122 and 124 of lower portion 120. As also illustrated in FIG. 1B, screw 152 extends through nut 130. As discussed previously, when screw 152 is rotated, the lower portion of clamp 130, including members 122 and 124, exert an upward force to provide a clamping force to secure various components, such as solar panels, located between members 112/114 and 122/124.

Figure 2:
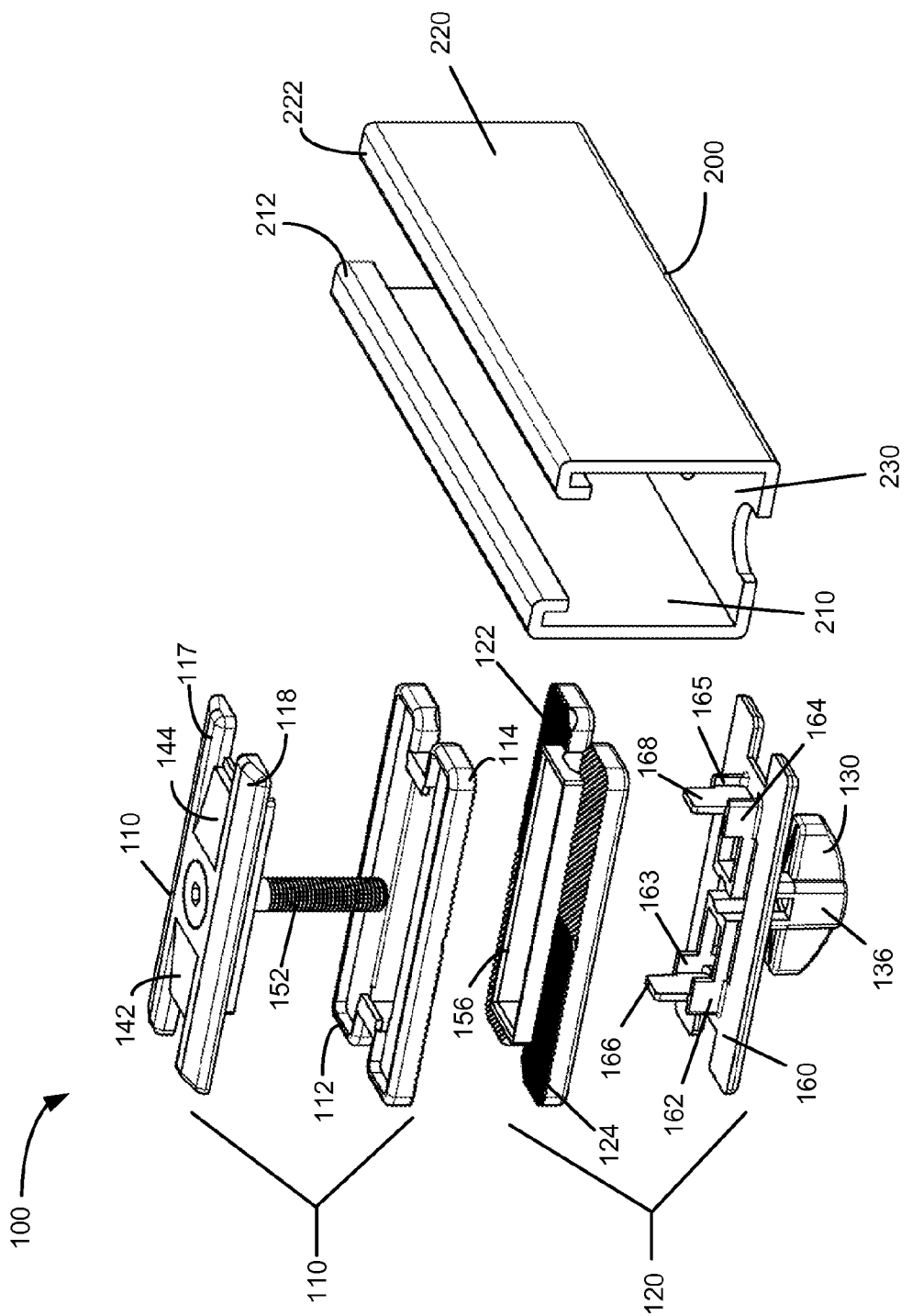
FIG. 2 is an exploded view of the clamp of FIG. 1A, along with a strut to which the clamp may be connected.

FIG. 2 illustrates an exploded view of clamp 100, along with a structural/framing member 200 to which clamp 100 may be coupled. Referring to FIG. 2, upper portion 110 includes members 112 and 114 and an opening for screw 152. Portions 117 and 118 of members 112 and 114 are shown separated from the lower portions of members 112 and 114 for illustrative purposes. However, in exemplary implementations, portions 117 and 118 are integrally formed with the lower part of members 112 and 114 illustrated in FIG. 2.

Lower portion 120 includes members 122, 124 and base portion 160, also referred to herein as member 160. In an exemplary implementation, members 122 and 124 are integrally formed with member 160. In addition, in an exemplary implementation, nut 130 may be integrally coupled to member 160, as illustrated in FIG. 2. Member 160 may represent a base of lower portion 120 and may include arm-like structures 162, 163, 164 and 165 that extend from the center area of member 160. Structures 162-165 integrally connect with nut 130 and provide an upward clamping force when screw 152 is tightened. For example, structures 162-165 may each include a vertical portion that extends through an opening in base portion 160 to central portion 136 of nut 130. Member 160 also includes projections 166 and 168 that extend vertically from either end of the surface of member 160. Projections 166 and 168 are received by corresponding slots in upper portion 110 (not shown in FIG. 2), as described in more detail below. Although four structures 162-165 are illustrated in the implementation illustrated in FIG. 2, in other implementations, other numbers of structures may be coupled to the central portion 136 of nut 130. For example, in some implementations, other numbers of structures (e.g., one, two, three, or five or more) similar to structures 162-165 may extend horizontally from the center area of member 160 and may be coupled via vertical portions to the central portion 136 of nut 130.

Clamp 100, as described above, may be used to clamp various components together, such as solar panels to one or more framing structures. For example, FIG. 2 illustrates a framing structure 200, also referred to herein as strut 200, to which clamp 100 may be connected. Referring to FIG. 2, strut 200 may be a framing element fabricated using metal, plastic or some composite material. In one implementation, a large number of struts 200 may form a structure (sometimes referred to as a solar table) upon which solar panels may be mounted.

Strut 200 may include sides 210 and 220, bottom 230 and an open side opposite bottom 230. Strut 200 may have a substantially U-shaped cross-sectional shape, as illustrated in FIG. 2. Sides 210 and 220 may also include curved or J-shaped extensions 212 and 222, also referred to as rims 212/222 that extend from the sides of strut 200, as also illustrated in FIG. 2. Extensions 212/222 may contact side portions 132/134 of nut 130 when clamp 100 is coupled to strut 200, as described in detail below. In some implementations, nut 130 may be inserted through a slot (not shown) located in bottom portion 230 when strut 200 is oriented such that "bottom" portion 230 is in an inverted position with respect to the orientation illustrated in FIG. 2 (e.g., bottom 230 is located above the open end of strut 200), as described in more detail below.

Figure 3:
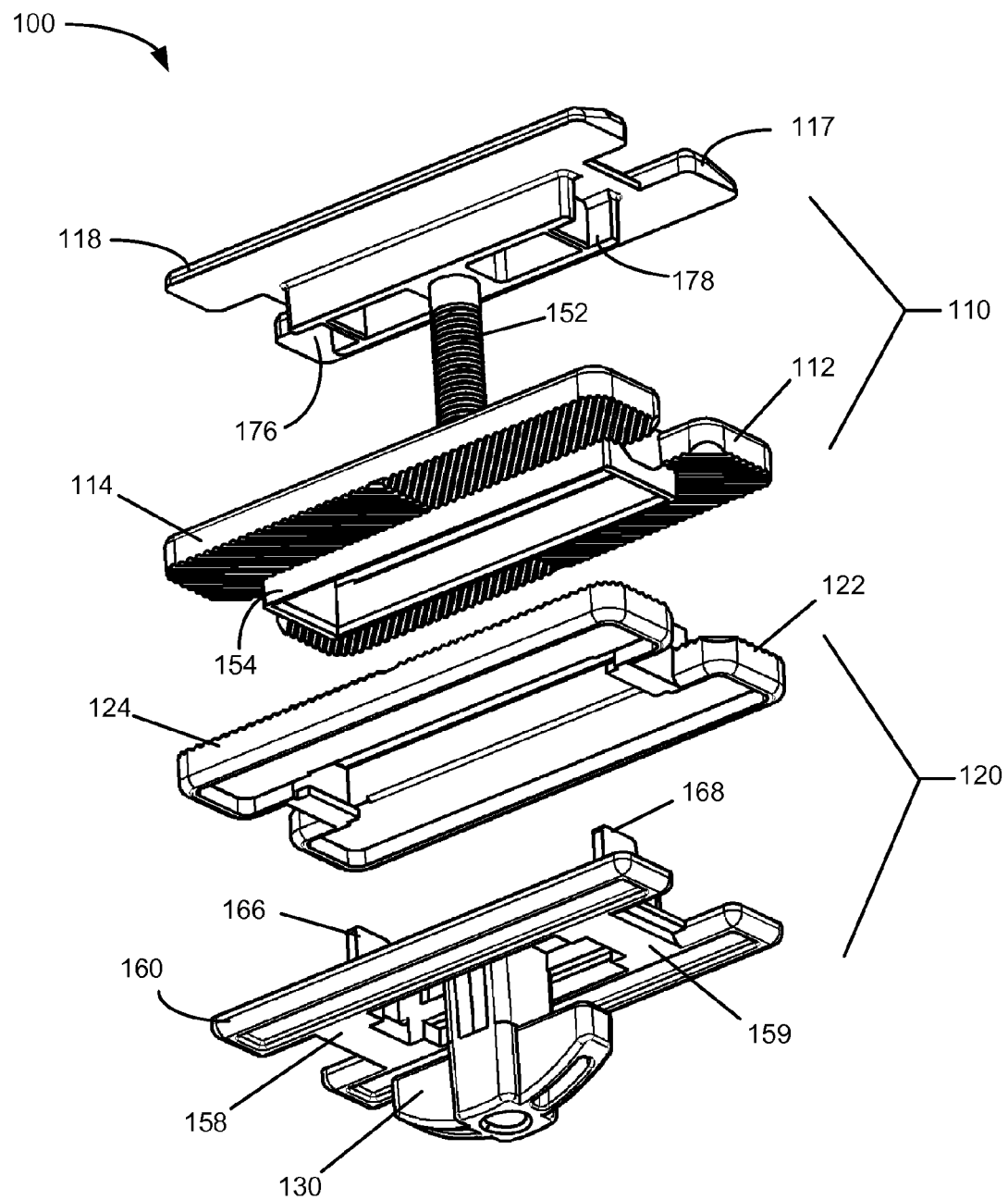
FIG. 3 is another exploded view of the clamp of FIG. 1A.

FIG. 3 illustrates another exploded view of clamp 100. As illustrated in FIG. 3, the lower side of upper portion 110 includes openings 176 and 178. Projections 166 and 168 of lower portion 120 extend into openings 176 and 178, respectively, when clamp 100 is tightened. Projections 166 and 168 and corresponding openings 176 and 178 help prevent rotation of lower portion 120 with respect to upper portion 110 when clamp 100 is installed in strut 200.

Figure 4:
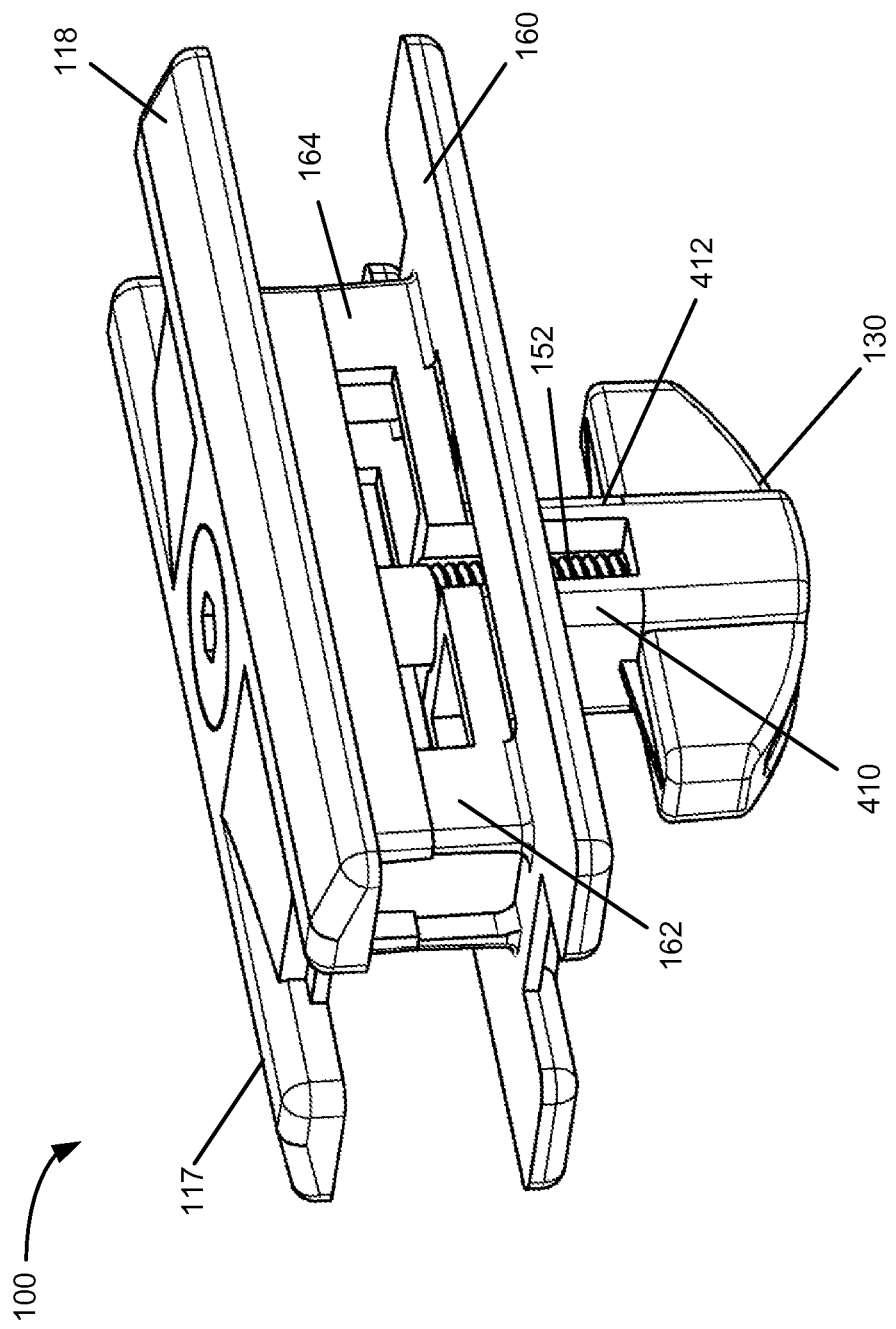
FIG. 4 is another isometric view of the clamp of FIG. 1A.

FIG. 4 illustrates another perspective view of clamp 100. FIG. 4 does not show members 112, 114, 122 and 124 for clarity with respect to illustrating structures 162 and 164. As illustrated, structures 162 and 164 extend outwardly from the center of member 160. Structures 162 and 164 are also integrally connected to nut 130 via vertical portions, labeled 410 and 412, respectively, in FIG. 4. Similarly, structures 163 and 165 (not shown in FIG. 4) located on the opposite side of the center of member 160 extend outwardly from the center of member 160 and also include vertical portions that are integrally connected to nut 130. Structures 162-165 aid in providing an upward clamping force when screw 152 is tightened, as described in more detail below.

Figure 5:
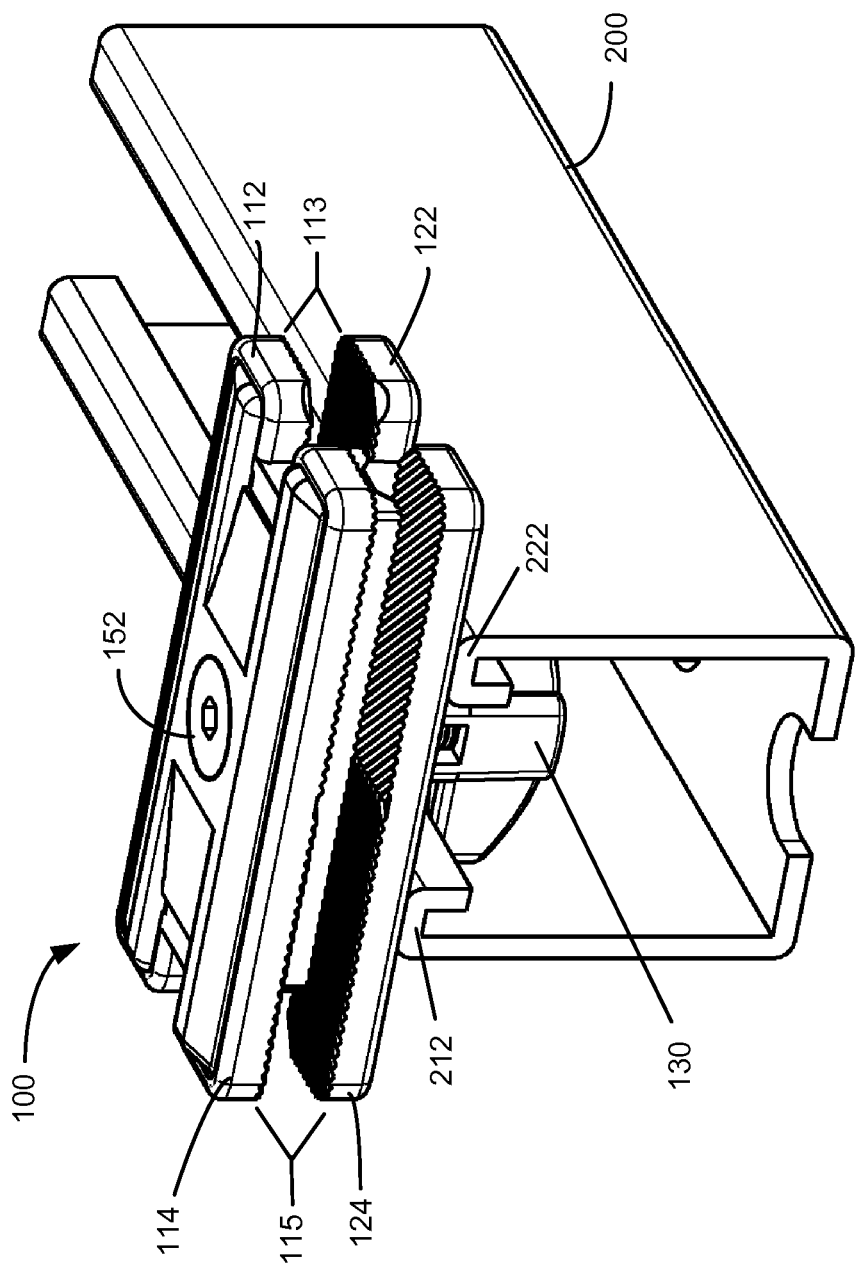
FIG. 5 is an isometric view illustrating the clamp of FIG. 1A connected to a strut in accordance with an exemplary implementation.

As described above with respect to FIG. 2, clamp 100 may connect to strut 200. For example, FIG. 5 illustrates clamp 100 connected to strut 200. As illustrated, nut 130 fits in the open end of the U-shaped strut 200 below rims 212 and 222. The upper surface of nut 130 contacts rims 212 and 222. In some implementations, clamp 100 may be pre-installed in strut 200 prior to installation of a number of struts. For example, clamp 100 may be pre-installed in strut 200 as illustrated in FIG. 5 prior to erecting a number of struts 200 that will be used to support a large number of solar panels. In one implementation, a solar panel may be installed or placed between members 112 and 122, at the area labeled 113 in FIG. 5, and/or between members 114 and 124, labeled 115 in FIG. 5. After the panel(s) is inserted, bolt 152 may be tightened. As bolt 152 is tightened, members 112 and/or 114 may move downward and provide a downward force on the panel. In addition, nut 130 moves upward to provide an upward clamping force to secure clamp 100 to strut 200. Member 160 also provides an upward clamping force via members 122 and 124 to secure the panel installed between members 112/114 and 122/124.

As discussed above, one solar panel (not shown) may be installed between members 112 and 122 in the opening/area illustrated as 113, and another solar panel (not shown) may be installed between members 114 an 124, in the opening/area illustrated as 115. Another strut (not shown) may be coupled to strut 200 to provide support for another end of the panel that may extend outwardly from clamp 100 in a direction parallel and/or perpendicular to the length of strut 200. Another clamp located a distance away and coupled to the other strut may secure the other end of the panel. In each case, when screw 152 is tightened, members 112 and 114 may lower to provide a downward clamping force to secure the panel(s). Simultaneously, an upward clamping force may be provided by members 122 and 124 to provide adequate clamping force to ensure that the panel(s) remain in place.

Figure 6:
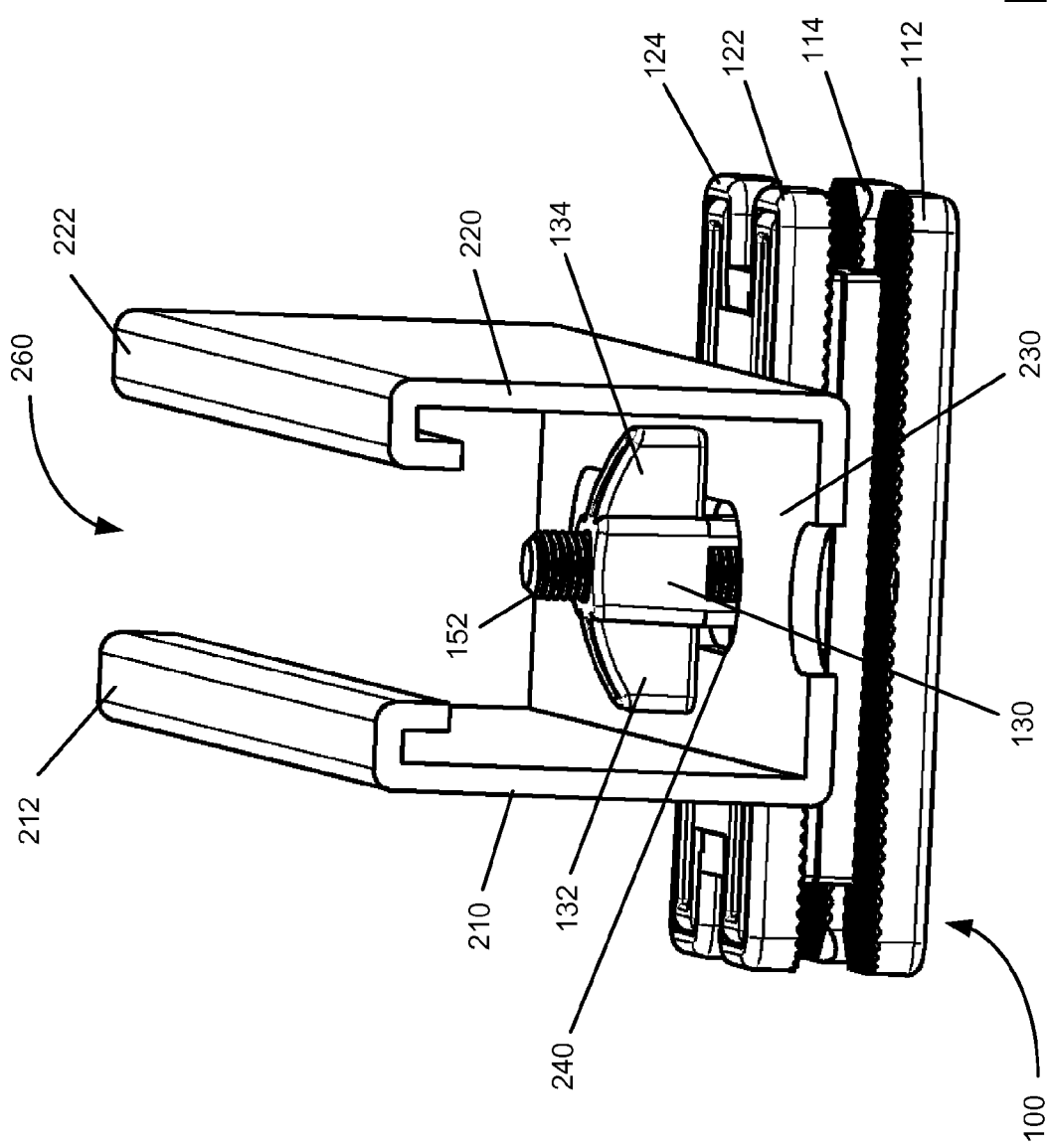
FIGS. 6 and 7 are isometric views illustrating the clamp of FIG. 1A connected to a strut in accordance with another exemplary implementation.

As also described briefly above, in some implementations, clamp 100 may be coupled to bottom portion 230 of strut 200. For example, FIG. 6 illustrates clamp 100 coupled to strut 200 at bottom portion 230. Referring to FIG. 6, strut 200 includes a slot or opening 240 located in bottom portion 230 adjacent slot 240. In this implementation, side portions 132 and 134 of nut 130 may be shorter than side portions 132 and 134 of nut 130 shown in FIG. 5 since the side portions do not have to extend as far in the horizontal direction to secure clamp 100 to strut 200. In other implementations, nut 130 shown in FIG. 6 may be identical to nut 130 shown in FIG. 5. In either case, screw 152 may extend through opening 240 and the upper surface of nut 130 may contact bottom portion 230. Similar to the implementation illustrated in FIG. 5, when screw 152 is tightened, nut 130 provides a clamping force via members 162-165 and member 122 and/or 124. In this implementation, the clamping force may be provided by members 122 and/or 124 via members 162-165 (not shown in FIG. 6).

Figure 7:
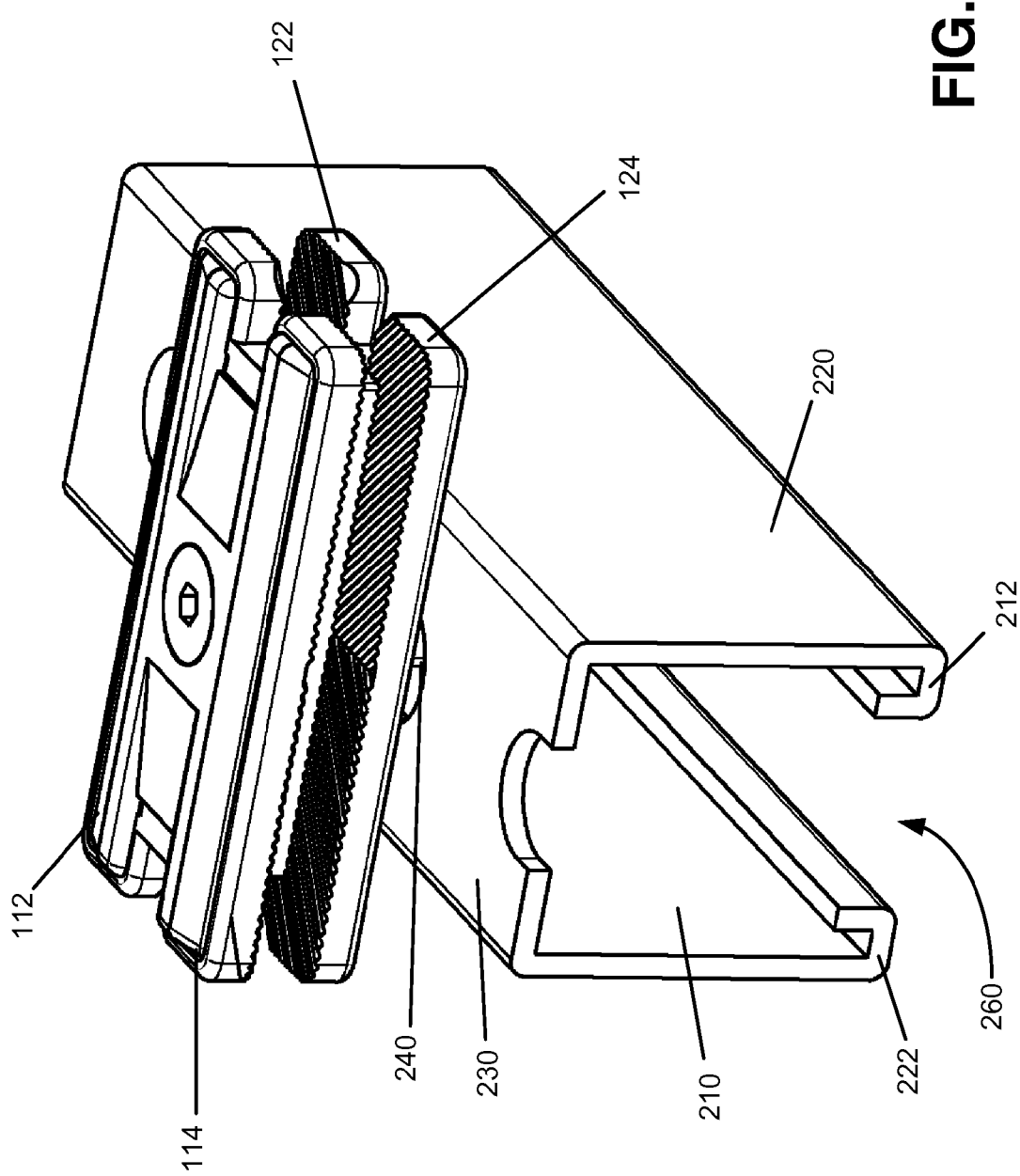

FIG. 7 illustrates clamp 100 of FIG. 6 connected to strut 200 in an inverted position with respect to the orientation illustrated in FIG. 6. That is, strut 200 is oriented such that the open side 260 adjacent rims 212/222 is located below clamp 100. The configuration in FIG. 6 may ensure that water or other moisture does not collect in the lower portion of strut 200. Similar to FIG. 5, when screw 152 is tightened, nut 130 provides an upward clamping force via structures 162-165 and members 122 and/or 124. As described above with respect to FIG. 5, in some implementations, clamp 100 may be pre-installed in strut 200, as illustrated in FIG. 7, prior to erecting a number of struts 200 that will be used to support a large number of panels, such as solar panels.

In the embodiment illustrated in FIGS. 1A-7, clamp 100 provides for a simple installation of panels, such as solar panels, between members 112 and 122 and/or between members 114 and 124. That is, one end of a panel may be placed on member 122 and/or 124 and screw 152 is tightened to secure the panel. In addition, clamp 100 provides adequate clamping force to maintain structural integrity of an installation without requiring specialized tools, such as torque wrenches to provide an adequate clamping force to secure the panels or secure the clamp to the strut.

Figure 8:
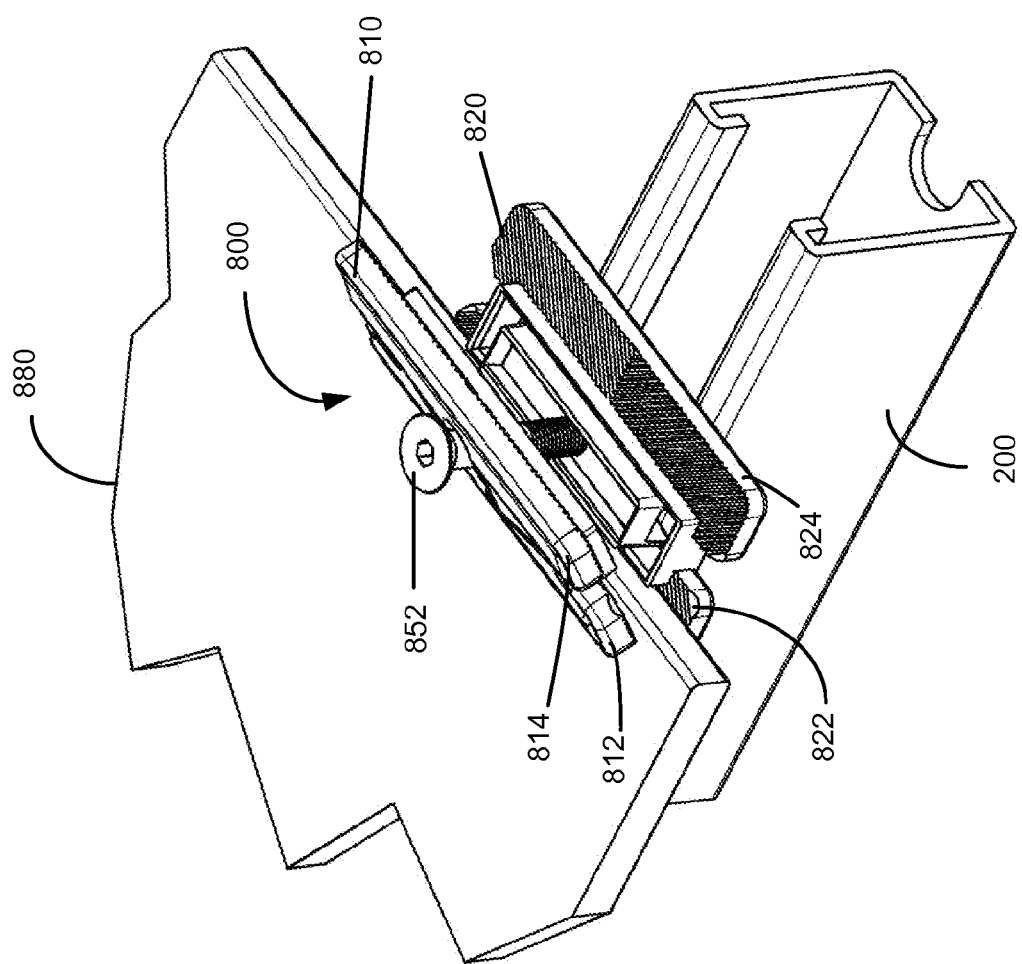
FIG. 8 is an isometric view of a clamp, strut and panel consistent with another exemplary embodiment.

In another exemplary embodiment, the top portion or head of the clamp may rotate or tilt to allow the clamp to provide additional clearance for installing a panel, such as a solar panel. In this embodiment, the clamp may be pre-installed in a framing system prior to installation of a panel. FIG. 8 illustrates an exemplary embodiment including clamp 800, strut 200 and panel 880. Referring to FIG. 8, clamp 800 includes upper or head portion 810, lower portion 820, a nut (not shown in FIG. 8) and screw 852. Strut 200 may be similar to strut 200 described above. Panel 880 may represent a panel, such as a frameless solar panel, that may be secured by clamp 800.

In FIG. 8, head portion 810 is shown in a rotated or tilted position with respect to screw 852. In this embodiment, head portion 810 may tilt such that the top portion of clamp 800 is moved to provide extra clearance for inserting a panel between upper portion 810 and lower portion 820, as described in more detail below. For example, upper portion 810 includes members 812 and 814 and lower portion 820 includes members 822 and 824. Members 812, 814, 822 and 824 may be configured and may function similarly to members 112, 114, 122 and 124 described above.

Figure 9:
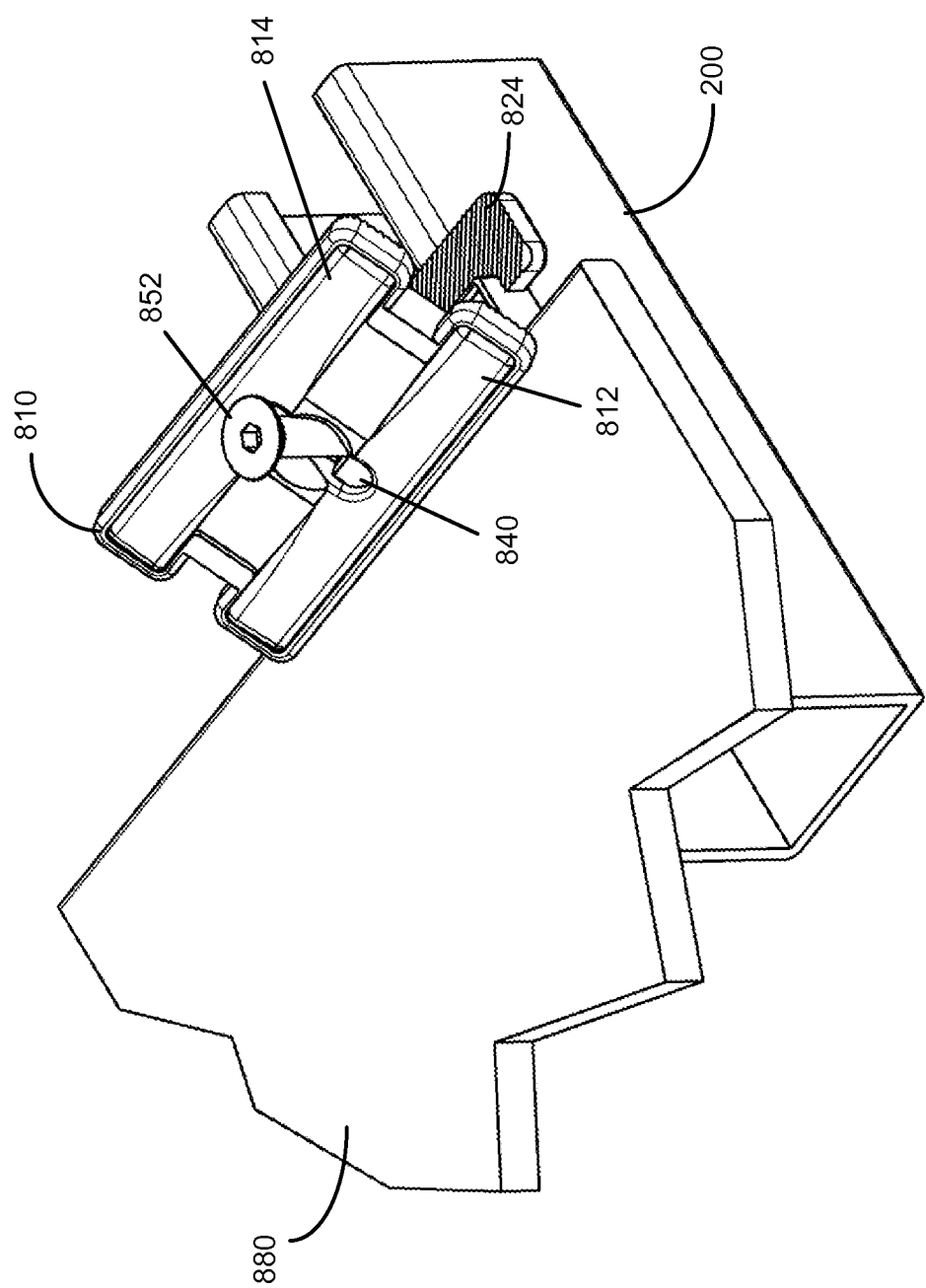
FIG. 9 is another isometric view of the clamp, strut and panel of FIG. 8.

FIG. 9 illustrates another view of clamp 800 coupled to strut 200 and panel 880. As illustrated, screw 852 is inserted in an opening in top portion 810, similar to screw 152 described above. In this embodiment, upper portion 810 includes slot 840 that extends outwardly from either side of the central opening for screw 852. Slot 840 allows top portion 810 to rotate or tilt in either direction with respect to screw 852, as illustrated in FIG. 9. Rotating or tilting top portion 810 in the manner illustrated in FIG. 8 facilitates installation of a panel between members 814 and 824. That is, by tilting top portion 810, an installer may have additional clearance for placing a panel onto the upper surface of member 824. Although not shown in FIG. 8 or 9, top portion 810 may be tilted in the opposite direction when panel 880 was placed onto surface 822.

Figure 10:
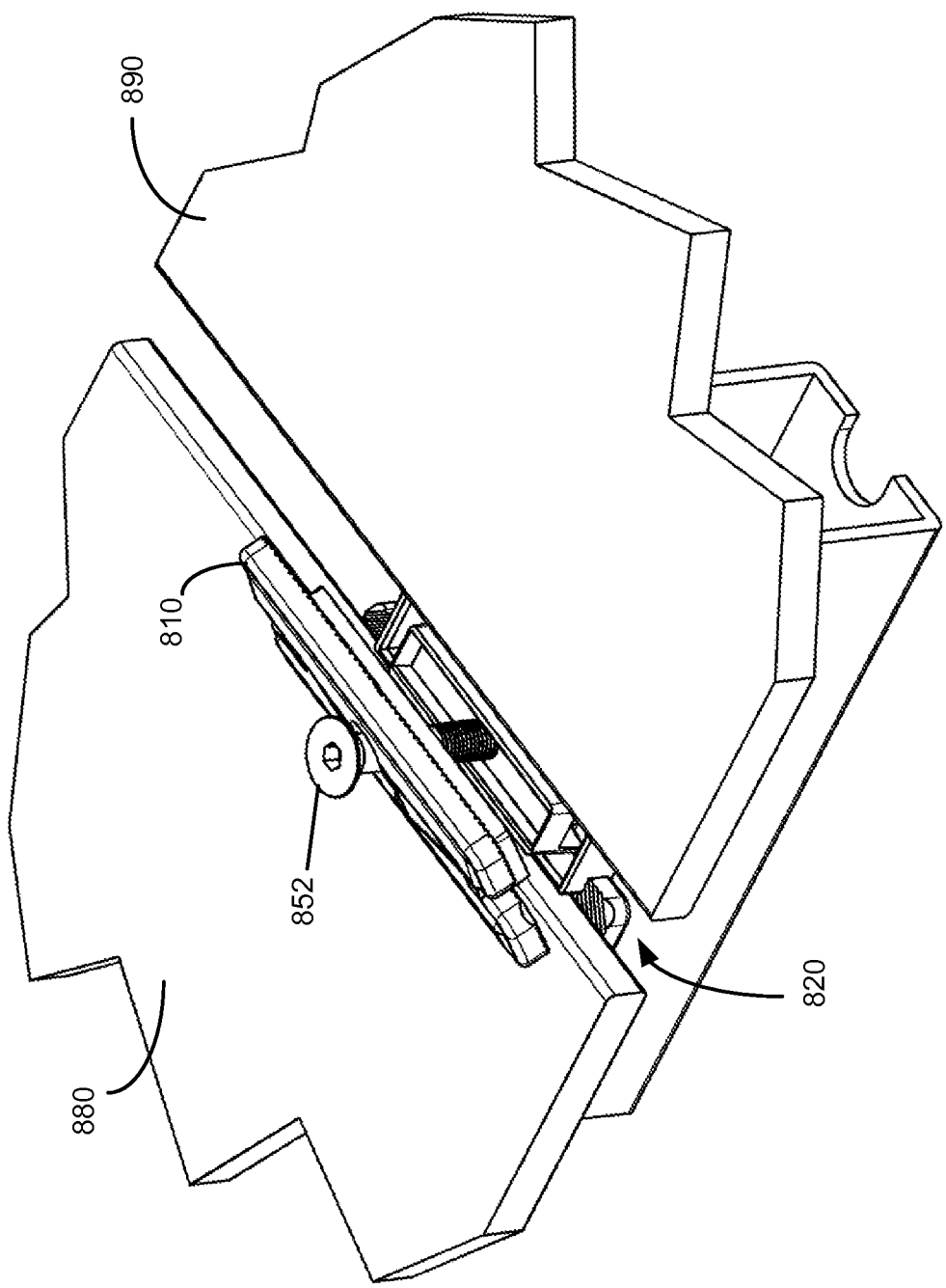
FIG. 10 is an isometric view of the clamp and strut of FIG. 8, along with two panels to be secured by the clamp.
Figure 11:
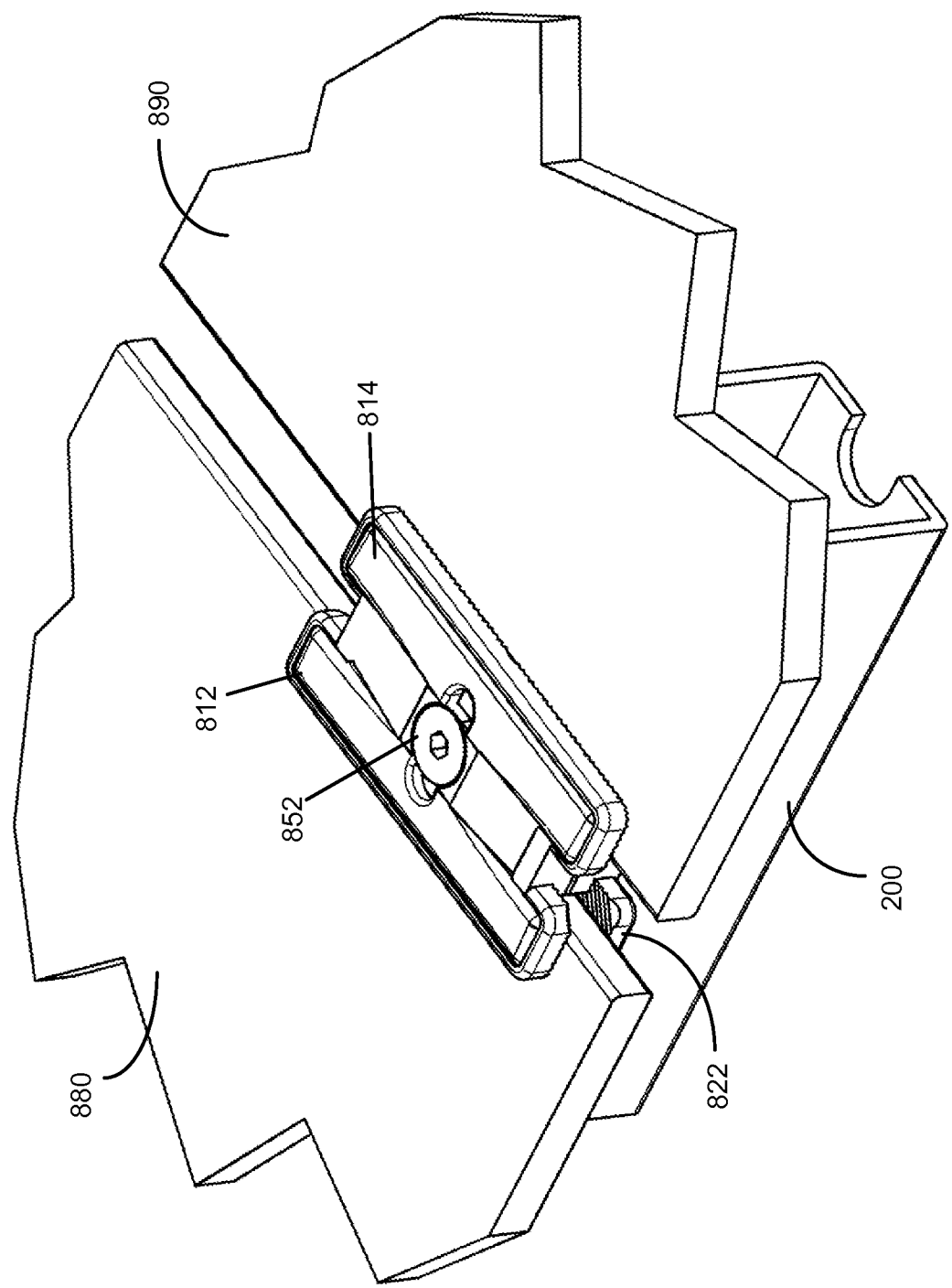
FIG. 11 illustrates the clamp, strut and panels of FIG. 10 in a clamped position.

FIG. 10 illustrates installation of a second panel 890 onto clamp 800. Panel 890 may represent, for example, a frameless solar panel to be secured by clamp 800. As illustrated, panel 890 may be placed onto member 824 (not shown in FIG. 10) of lower portion 820 while head portion 810 is tilted to provide clearance when panel 890 is lowered into place on member 824. After panel 890 is in place, head portion 810 may be rotated or tilted such that top portion 810 is parallel to panels 880 and 890 and screw 852 may be tightened, as illustrated in FIG. 11. In this manner, screw 852 provides a downward clamping force on members 812 and 814, which in turn provides a downward clamping force on panels 880 and 890. Lower portion 820 of clamp 800 simultaneously provides an upward clamping force on members 822 and 824 to hold panels 880 and 890 in place. In this embodiment, the tiltable head portion 810 facilitates installation of panels 880 and 890.

Figure 12:
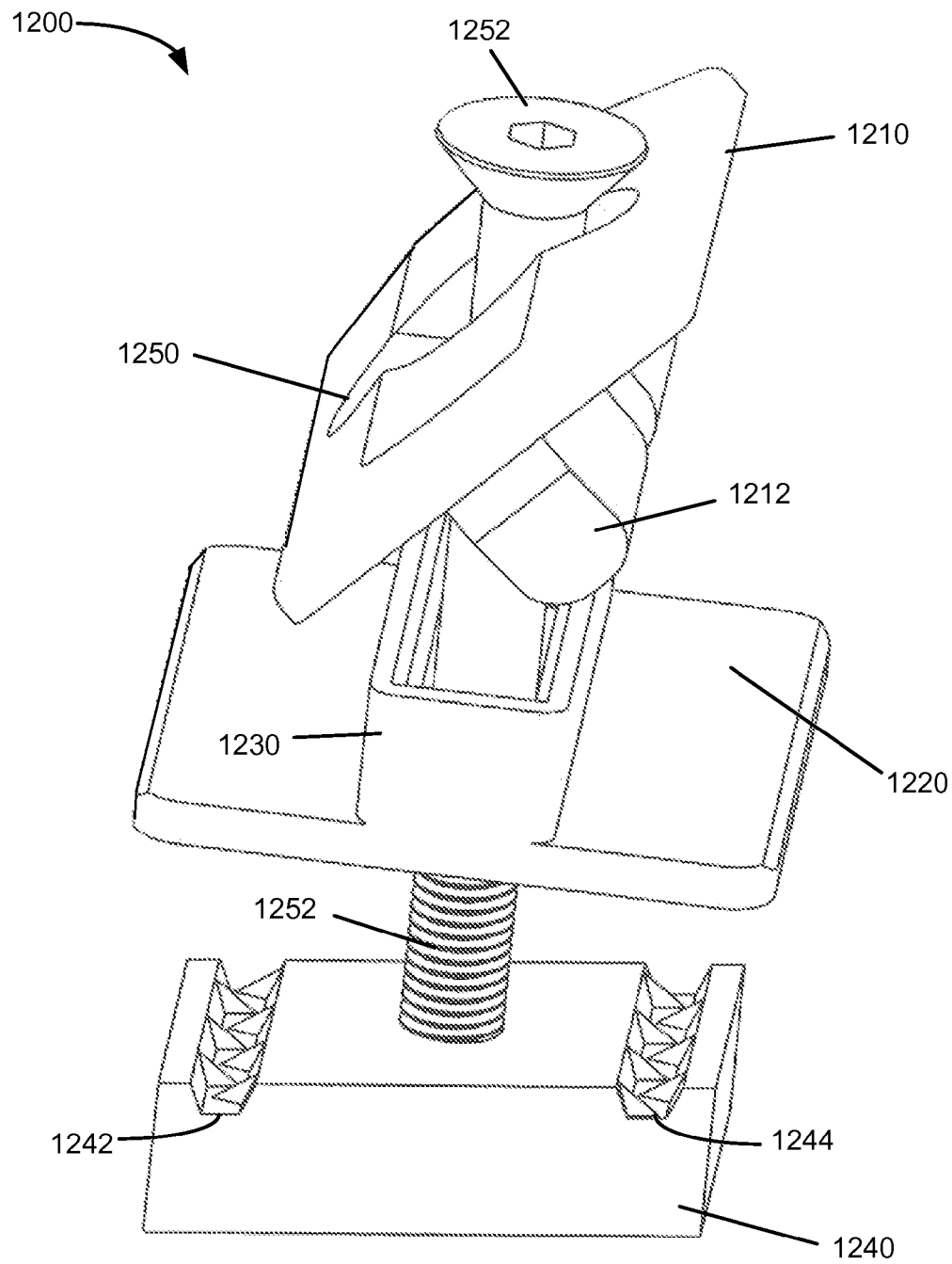
FIG. 12 is an isometric view of a clamp consistent with still another exemplary embodiment.

FIG. 12 illustrates another exemplary embodiment in which the top portion or head of the clamp may rotate or tilt to allow the clamp to provide additional clearance during installation of a panel (e.g., a solar panel). Referring to FIG. 12, clamp 1200 includes upper or head portion 1210, lower portion 1220, base 1240 and screw 1252. As illustrated in FIG. 12, upper or head portion 1210 is shown in a rotated or tilted position with respect to screw 1252. In this embodiment, head 1210 may tilt such that the top portion of clamp 1200 may provide adequate clearance for inserting a panel between upper portion 1210 and lower portion 1220, as described in more detail below.

Upper portion 1210 includes integral member 1212 that rotates with top portion 1210. Lower portion 1220 includes projection 1230 that receives member 1212 when head portion 1210 is tilted back such that the upper surface of head portion 1210 is substantially parallel to lower portion 1220.

Base 1240 includes a threaded opening for receiving screw 1252. Base 1240 also includes notches 1242 and 1244 located on either side of base 1240. Notches 1242 and 1244 may receive rims of a strut, as described in more detail below.

Figure 13:
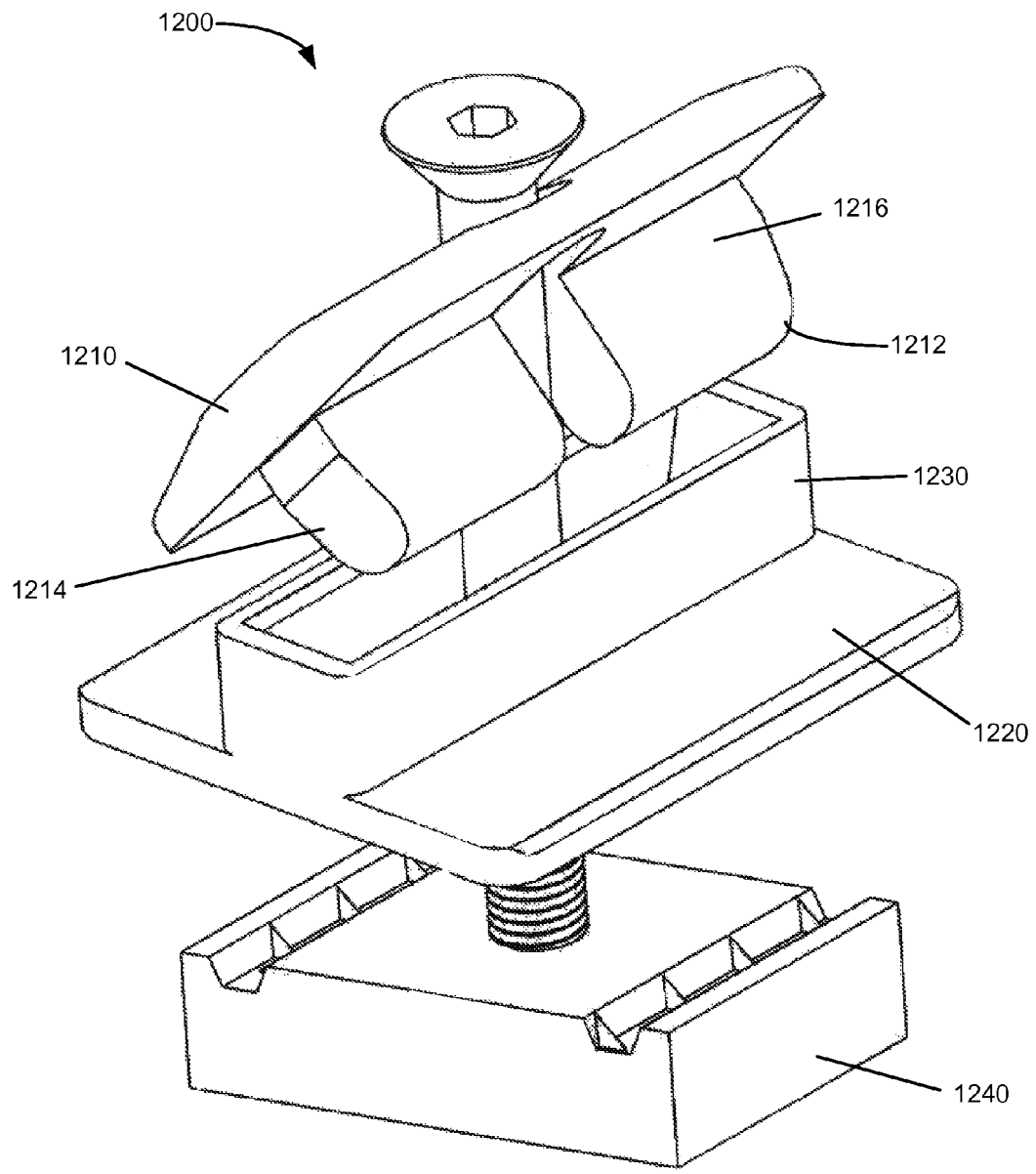
FIG. 13 is another isometric view of the clamp of FIG. 12.

FIG. 13 illustrates another isometric view of clamp 1200. As illustrated, member 1212 includes two portions labeled 1214 and 1216 separated by a central opening that allows screw 1252 to pass. Portions 1214 and 1216 are received by projection 1230 of lower portion 1220 when head portion is tilted back after a panel is placed on lower portion 1220.

Figure 14:
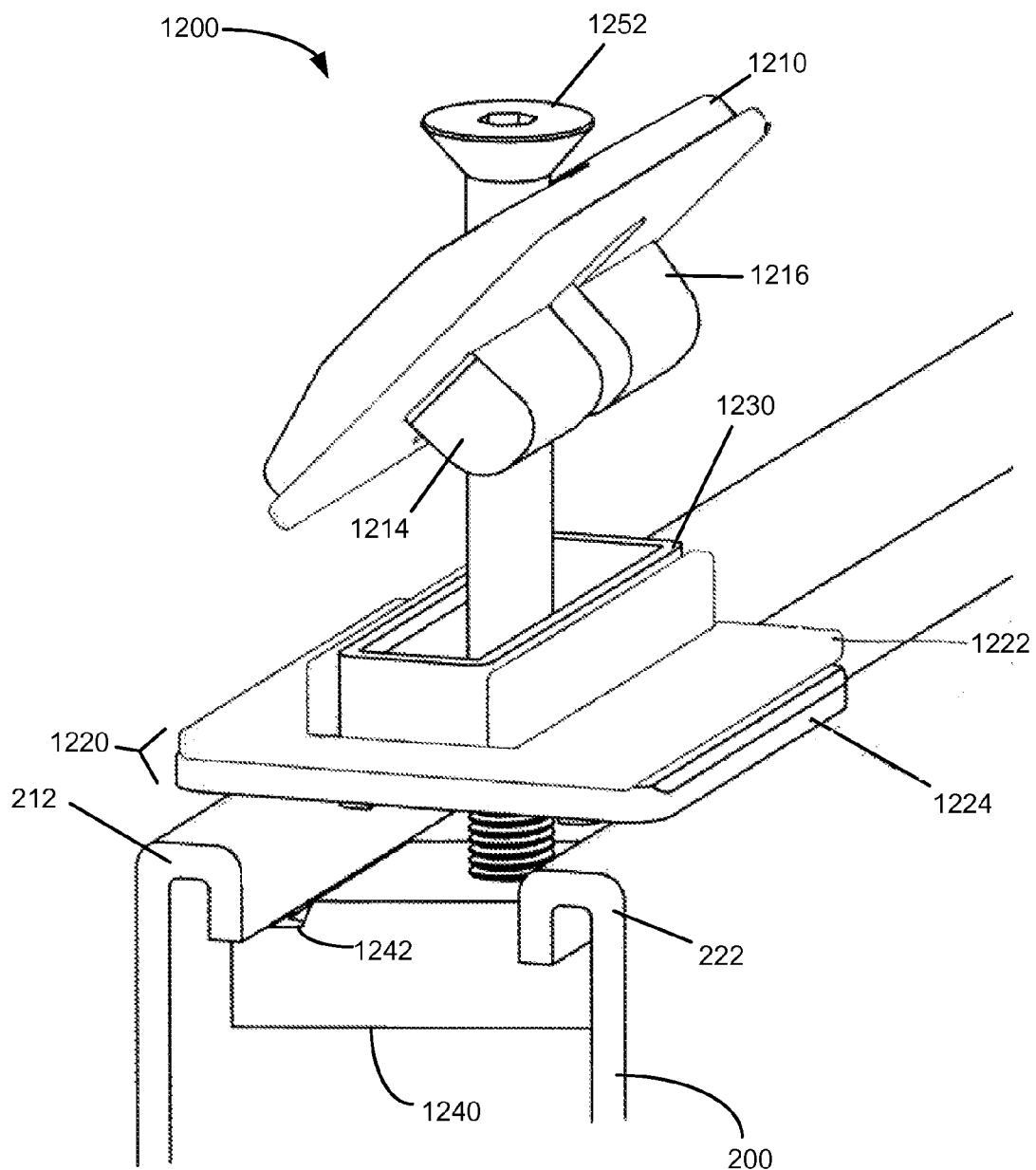
FIG. 14 is an isometric view of the clamp of FIG. 12 connected to a strut.

FIG. 14 illustrates a perspective view of clamp 1200 coupled to strut 200. Strut 200 may be configured in a similar manner as described above with respect to FIG. 2. For example, strut 200 may include rims 212 and 222 and an opening between rims 212 and 222, as illustrated in FIG. 14. Upon installation, rims 212 and 222 may rest in notches 1242 and 1244, respectively. As also illustrated, members 1214 and 1216 are integrally connected to top portion 1210 and rotate with top portion 1210. Top portion 1210 may tilt as illustrated in FIG. 14 to allow a panel to be placed onto low portion 1220. In an exemplary implementation, lower portion 1220 may include surfaces 1222 and 1224. Surface 1222 may be a cushioned surface, such as a rubber surface, for receiving a panel that does not include a frame (e.g., a frameless solar panel). Surface 1224 may be a flat surface on which surface 1222 rests. Surface 1222 may also extend vertically to provide a cushioned surface abutting projection 1230, as illustrated in FIG. 14. In addition, the lower surface of upper portion 1210 may be a cushioned surface, such as a rubber surface or other resilient surface, that will contact an upper surface of one or more panels.

Figure 15:
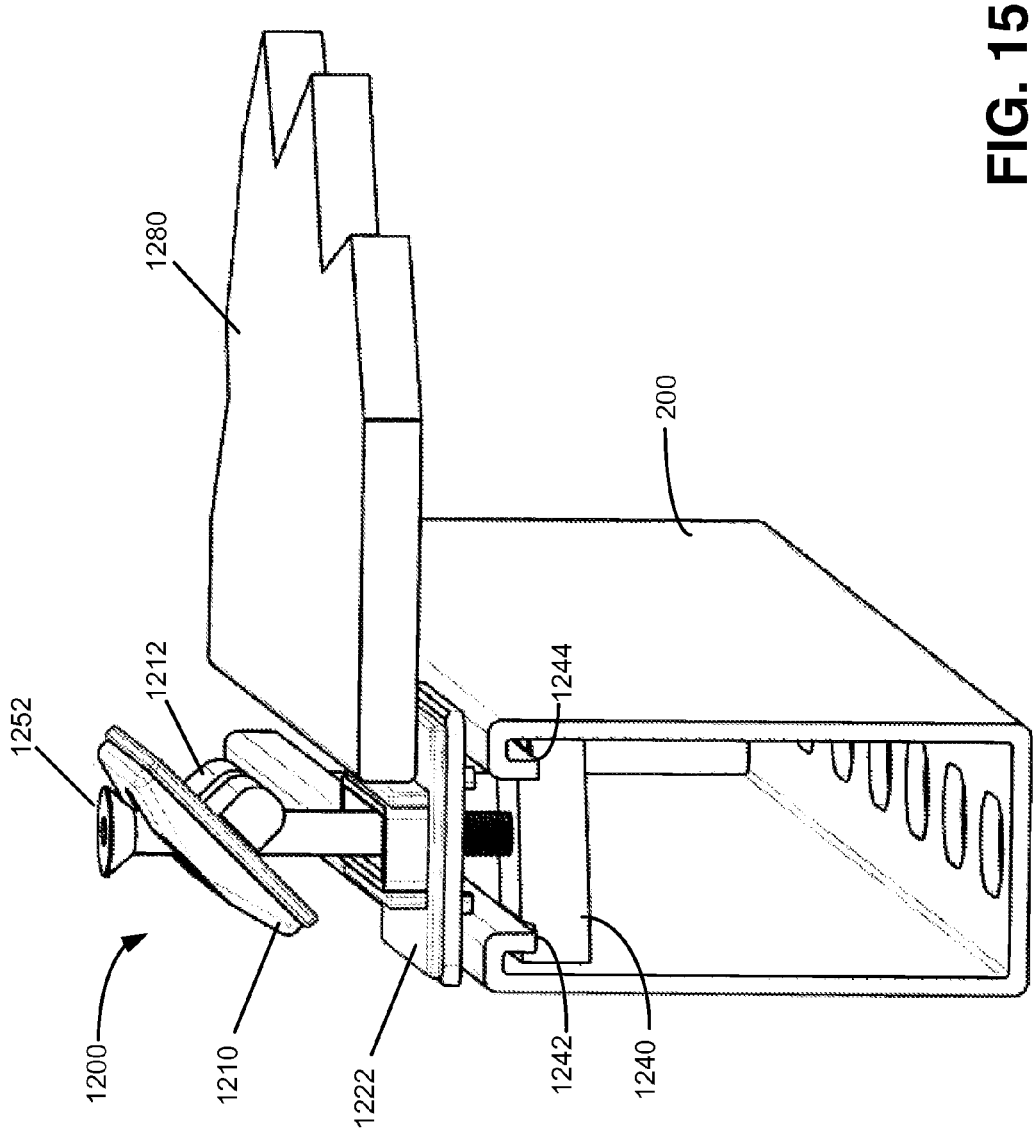
FIG. 15-17 are isometric views illustrating the installation of a panel with respect to the clamp and strut of FIG. 14.

FIG. 15 illustrates panel 1280 placed onto surface 1222. Similar to panel 880, panel 1280 may be a solar panel, such as a frameless solar panel. Screw 1252 is inserted in an opening in top portion 1210, similar to screw 852 described above. In this embodiment, upper portion 1210 includes slot 1250 (shown in FIG. 12) that extends on either side of screw 1252. The slot (not shown in FIG. 15) allows top portion 1210 to rotate or tilt in with respect to screw 1252, as illustrated in FIG. 15. This may help provide additional clearance for installing/placing panel onto surface 1222. Top portion 1210 may also tilt in the opposite direction to that illustrated in FIG. 15 to allow another panel to be installed onto the opposite side of surface 1222.

Figure 16:
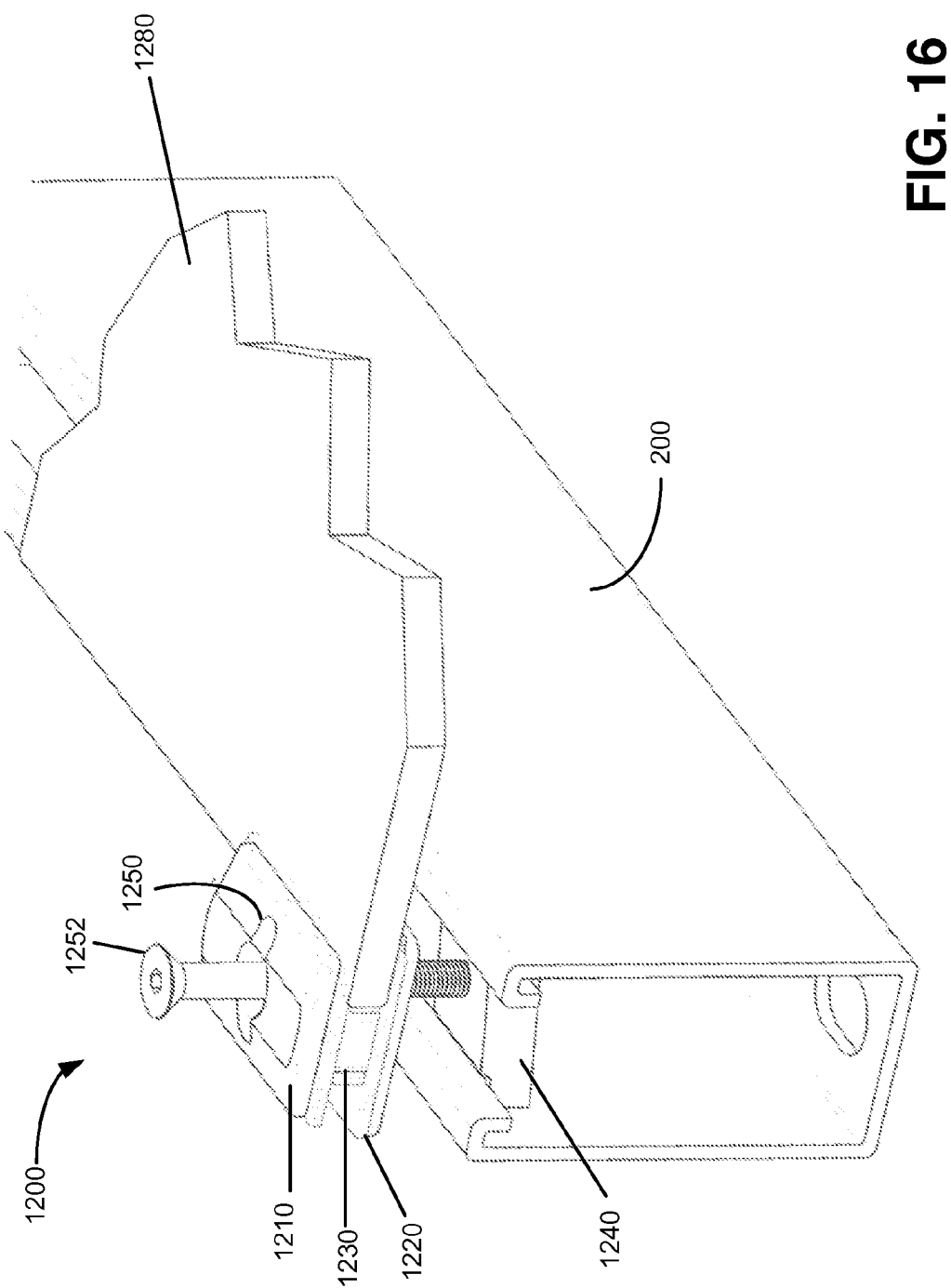

FIG. 16 illustrates another step in the installation of panel 1280. As discussed above, slot 1250 located in top portion 1210 allows top portion 1210 to tilt with respect to screw 1252. After panel 1280 is installed on lower portion 1220, top portion 1210 may be tilted back to an orientation in which top portion 1210 is parallel to lower portion 1220 and the lower surface of lower portion 1210 abuts panel 1280, as illustrated in FIG. 16. In this position, member 1212 is received by projection 1230 so that screw 1252 may be tightened and panel 1280 may be secured.

Figure 17:
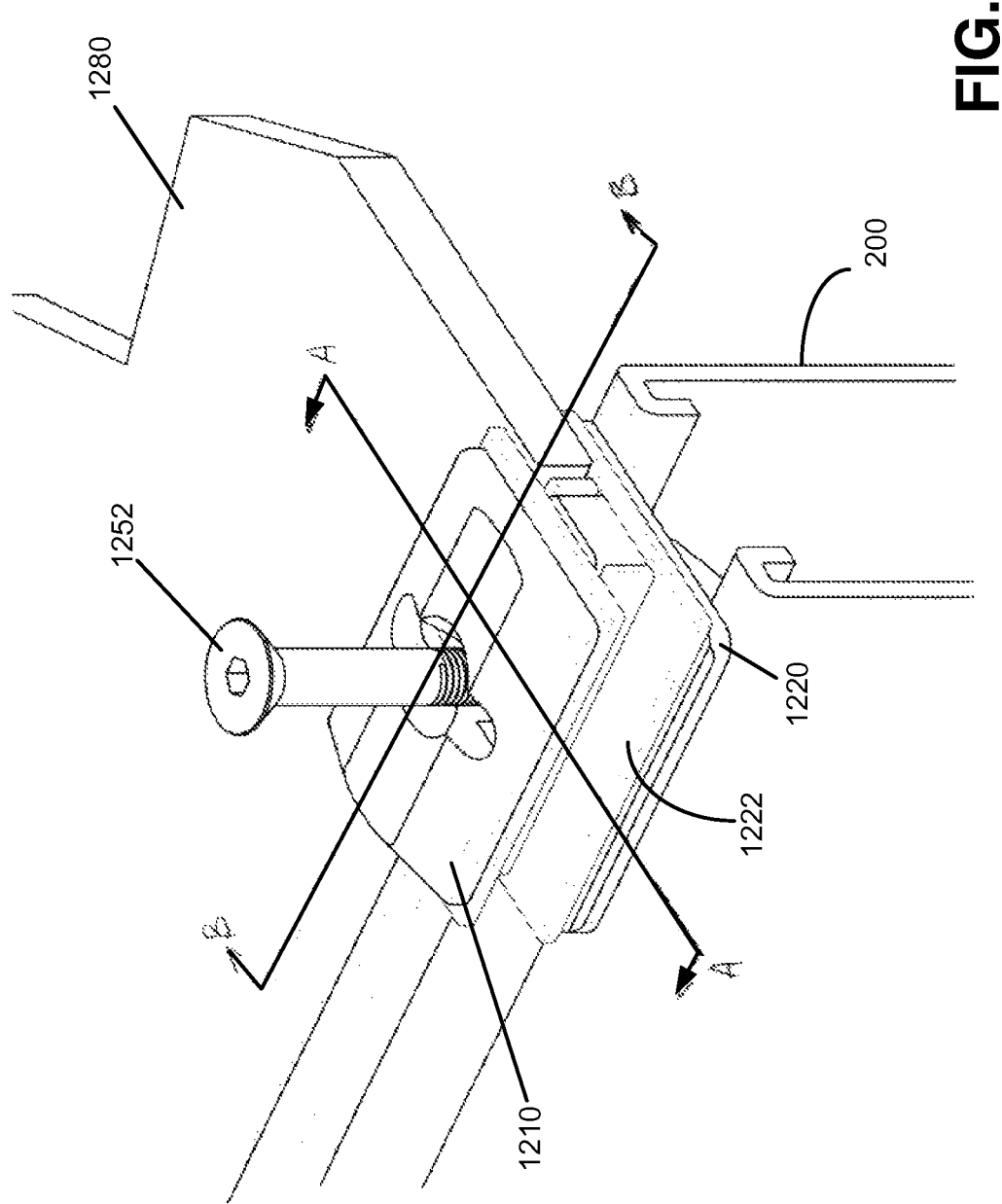

FIG. 17 illustrates another perspective view of clamp 1200, strut 200 and panel 1280. In discussed above, in some implementations, lower portion 1220 may include a cushioned surface 1222 that may abut panel 1280. The cushioned surface may prevent damage to a panel, such as a frameless solar panel. In addition, in some implementations, surfaces around projection 1230 may also be cushioned to facilitate installation of panel 1280 and prevent damage to panel 1280.

Figure 18:
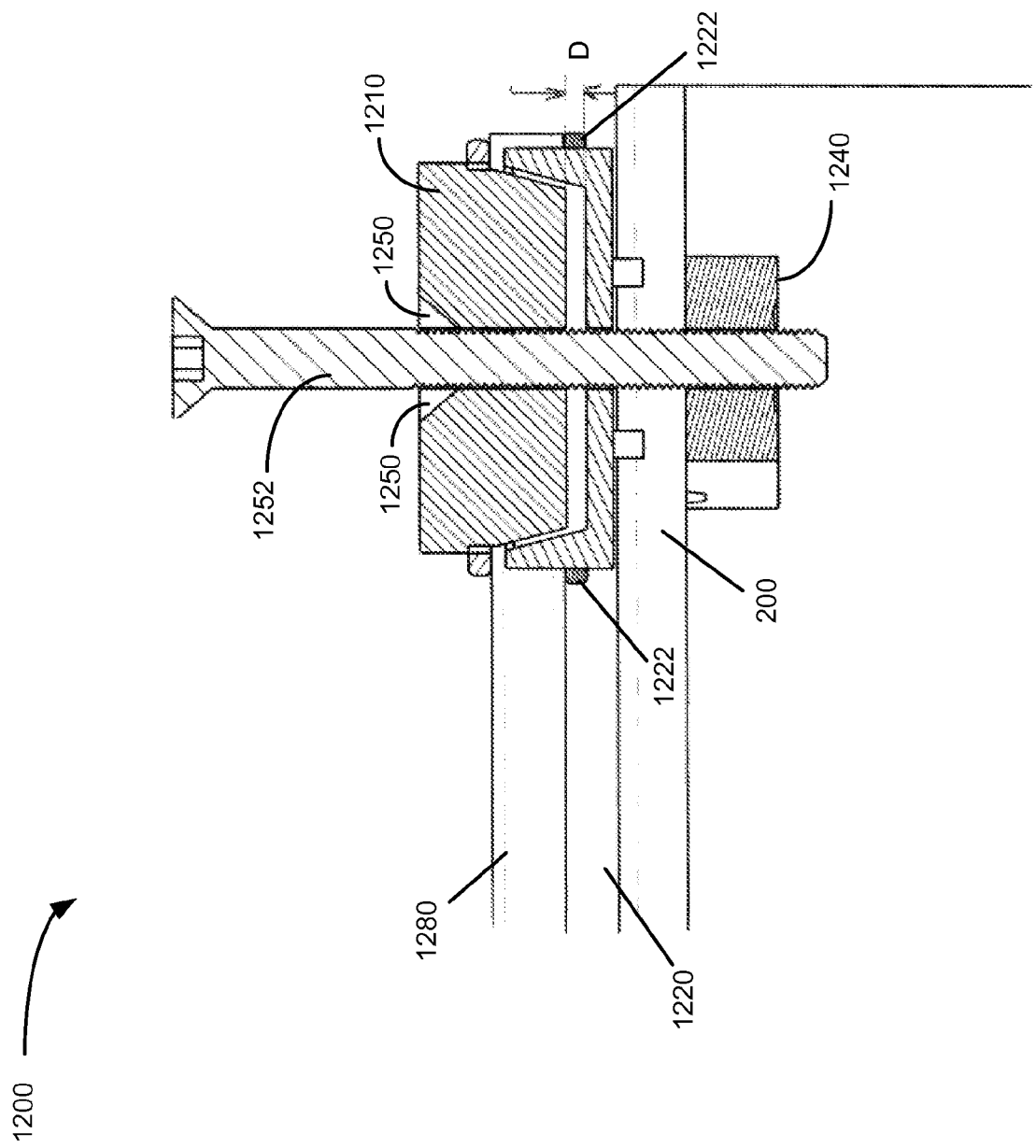
FIGS. 18 and 19 are cross-sectional views of the clamp, strut and panel of FIG. 17.

FIG. 18 illustrates a cross-section of clamp 1200, panel 1280 and strut 200 of FIG. 17 taken along line BB. Referring to FIG. 18, top portion 1210 may abut panel 1280. As also illustrated, panel 1280 may rest on lower portion 1220. More particularly, panel 1280 may rest on cushioned surface 1222, which may include a rubber surface or other cushioned surface. Surface 1222 may have a thickness labeled D in FIG. 18 and may compress by some amount when screw 1252 is tightened to provide the desired clamping force to secure panel 1280.

Figure 19:
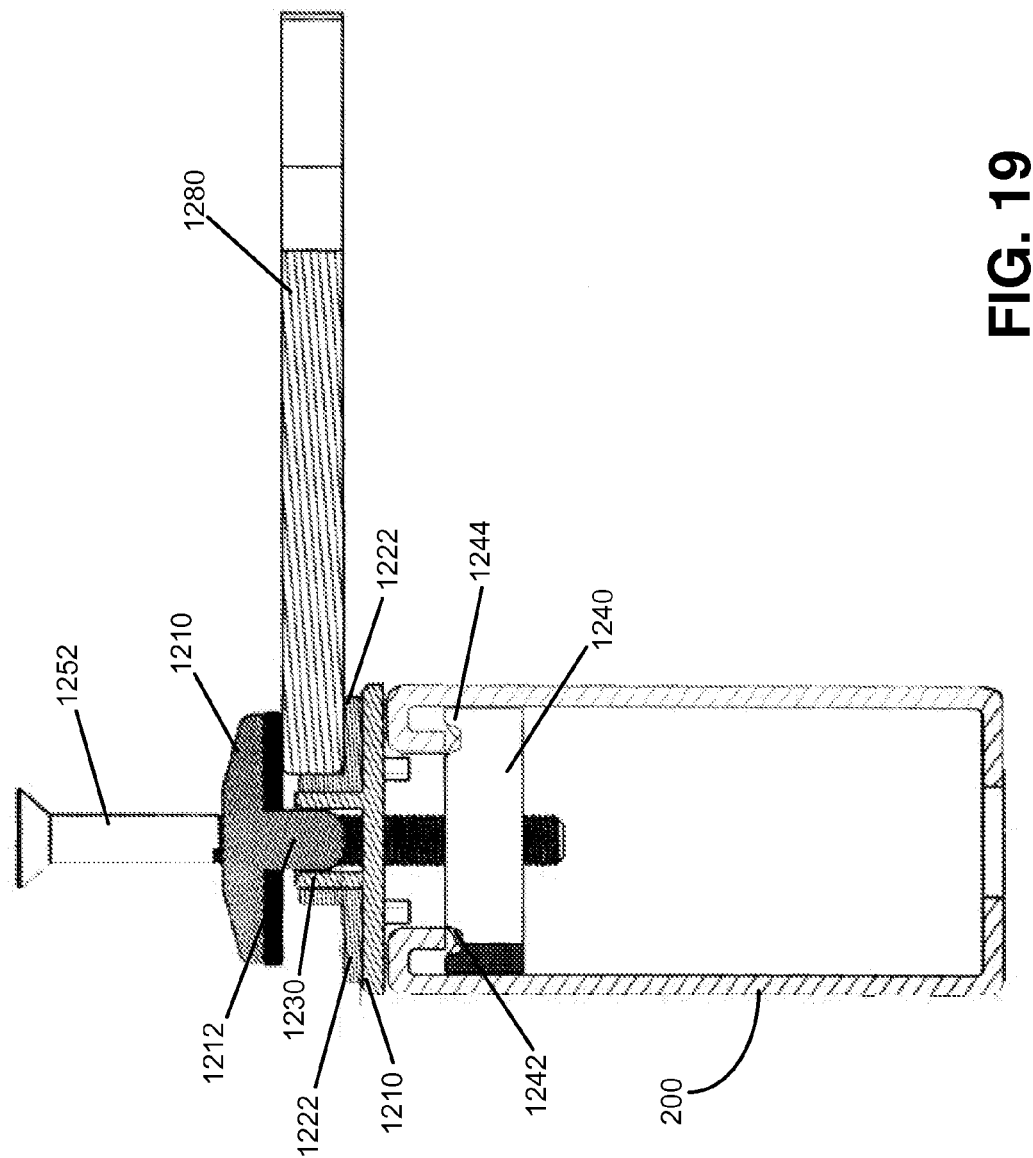

FIG. 19 illustrates a cross section of clamp 1200, panel 1280 and strut 200 of FIG. 17 taken along line AA. Referring to FIG. 19, the lower surface of top portion 1210 may abut one side of panel 1280 and the upper side of surface 1222 may abut the other side of panel 1280. As discussed above, surface 1222 may be a cushioned surface, such as a rubber surface. In addition, surface 1222 may extend vertically and abut projection 1230 to provide an additional cushioning for the end of panel 1280, as illustrated in FIG. 19. In addition, the lower surface of top surface 1220 may be cushioned to provide cushioning for the top surface of panel 1280.

Implementations described herein provide clamps that provide for easy installation of panels secured by the clamps, as well as easy installation of the clamps to structures (e.g., struts) that will support the panels. In each case, the clamp may be connected to a strut or other framing structure and provide an opening in which a panel may be clamped. In some implementations, the clamp may include cushioned surfaces for allowing frameless panels to be clamped without damaging the panels. In addition, in some implementations, the head of the clamp may tilt or rotate to facilitate installation of the panels. This may help save considerable time during installation.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to clamps 100, 800 and 1200 mounted to a strut and securing panels to be supported by the strut. In other implementations, clamps 100, 800 and 1200 may secure other structures and may be mounted to other types of support/framing structures.

Further, features of clamps 100, 800 and 1200 have been illustrated as having particular shapes/configurations. In other implementations, the various features may have other shapes/configurations. For example, upper portion 110 of clamp 100 and lower portion 120 of clamp 100 are shown as having substantially rectangular shapes. In other implementations, these portions or members of clamp 100 may have other shapes/configurations.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A clamp, comprising:
    an upper portion comprising first and second rectangular shaped members, a first rectangular shaped projection extending from the first and second rectangular shaped members, and a first central opening located between the first and second rectangular shaped members;
    a lower portion comprising third and fourth rectangular shaped members, a second rectangular shaped projection extending from the third and fourth rectangular shaped members, and a second central opening located between the third and fourth rectangular shaped members;
    a screw extending from an upper surface of the upper portion through the first and second central openings; and
    a nut integrally connected to the lower portion, the nut including threads to receive corresponding threads from the screw, wherein lower surfaces of the first and second members and upper surfaces of the third and fourth members define at least one opening, located adjacent the first and second projections, in which at least one component to be clamped is placed, wherein the lower portion further comprises a base portion including a plurality of structures extending in a first direction outwardly from a center of the base portion, wherein each of the plurality of structures includes a portion extending in a second direction perpendicular to the first direction and toward the upper portion, wherein the nut and the plurality of structures provide a clamping force to secure the at least one component, wherein the base portion further includes third and fourth projections located on opposite sides of the base portion and extending in the second direction toward the upper portion, and wherein the upper portion includes first and second openings located on a lower surface of the upper portion and configured to receive the third and fourth projections, respectively, wherein the third and fourth projections and first and second openings prevent rotation of the clamp when the at least one component is clamped.

2. The clamp of claim 1, wherein the nut includes a central portion having a threaded opening and two side portions located adjacent the central portion, wherein the central portion receives threads of the screw and the side portions are configured to fit below an open end of a strut or below a slot of a strut that provides support to the at least one component when the at least one component is clamped.

3. The clamp of claim 1, wherein the at least one component comprises a solar panel and wherein the at least one opening is sized to receive the solar panel.

4. The clamp of claim 1, wherein at least some of the surfaces of at least one of the first, second, third and fourth rectangular shaped members comprise cushioned surfaces.

5. The clamp of claim 1, wherein a combined height of the first and second projections define a minimum thickness of the at least one component that is to be clamped.

6. The clamp of claim 1, wherein the upper portion includes a slot located on an upper surface of the upper portion and extending on either side of the first central opening to allow the upper portion to rotate or tilt with respect to the screw.

7. The clamp of claim 6, wherein the upper portion is configured to rotate or tilt in a first direction with respect to the screw, and rotate or tilt in a second direction with respect to the screw, the second direction being different than the first direction.

8. The clamp of claim 1, wherein the at least one opening comprises a first opening located between the lower surface of the first rectangular member and the upper surface of the third rectangular member, and a second opening located between the lower surface of the second rectangular member and the upper surface of the fourth rectangular member.

9. An assembly, comprising:
a strut; and
a clamp coupled to the strut and configured to secure a panel, the clamp comprising:
a top portion having a substantially rectangular shape and having a first opening located in a center area of the top portion,
a lower portion having a substantially rectangular shape and having a second opening located in a center area of the lower portion,
a screw extending from an upper surface of the top portion through the first and second openings, and
a nut integrally connected to the lower portion, the nut being threaded to receive corresponding threads from the screw, wherein a lower surface of the top portion and an upper surface of the lower portion define two areas in which two components are to be clamped, wherein the lower portion further comprises a base portion including at least one vertical extension integrally coupled to the nut and at least one horizontal extension, wherein each of the at least one horizontal extension is coupled to one of the at least one vertical extension, the horizontal extension extending away from a center of the base portion and the vertical extension extending toward the top portion, wherein the nut, the at least one vertical extension and the at least one horizontal extension provide an upward clamping force to secure the two components when the screw is tightened, and wherein the base portion further comprises first and second projections located on opposite sides of the center of the base portion, wherein the top portion includes first and second slots located on a lower surface of the top portion and configured to receive the first and second projections, respectively, and wherein the first and second projections and first and second slots prevent rotation of the clamp.

10. The assembly of claim 9, wherein the nut includes a central portion having a threaded opening and two side portions located adjacent the central portion, wherein the central portion receives threads of the screw and the side portions are located below an open end of the strut and abut rims of the strut, or located below a side of the strut and abut a slot in the side of the strut, wherein the strut provides support to the two components when the two components are clamped.

11. The assembly of claim 9, wherein the two components comprise two solar panels, wherein a first one of the two areas is located on a first side of the clamp and a second one of the two areas is located on a second side of the clamp opposite the first side.

12. The assembly of claim 11, wherein the top portion includes a first rectangular shaped member and a second rectangular shaped member connected by a middle portion, and the lower portion includes a third rectangular shaped member and a fourth rectangular shaped member, and wherein the first area is located between the first and third rectangular shaped members and the second area is located between the second and fourth rectangular shaped members.

13. The assembly of claim 12, wherein surfaces of at least a portion of the first, second, third and fourth rectangular shaped members are cushioned.

14. The clamp of claim 9, wherein the top portion is rotatable or tiltable with respect to the screw.

15. The assembly of claim 9, wherein the clamp is coupled to the strut via side portions of the nut that contact rims of the strut, or via side portions of the nut that contact a side of the strut adjacent a slot in the side of the strut.

16. The assembly of claim 9, wherein the at least one horizontal extension comprises four horizontal extensions.

17. A method, comprising:
installing a clamp onto a strut, the clamp including an upper portion, a lower portion, a screw and a nut, wherein the upper portion includes a central opening through which the screw passes and a first slot extending on both sides of the screw, wherein the first slot allows the upper portion to tilt in a first direction with respect to the screw and tilt in a second direction with respect to the screw, and wherein the clamp is coupled to the strut via side portions of the nut that contact rims of the strut, or via side portions of the nut that contact a side of the strut adjacent a second slot in the side of the strut;

tilting the upper portion of the clamp in the first direction with respect to the screw prior to placing a first panel onto a first surface of the lower portion;

placing the first panel onto the first surface of the lower portion;

tilting the upper portion of the clamp in the second direction with respect to the screw prior to placing a second panel onto a second surface, the second direction being different from the first direction;

placing the second panel onto the second surface of the lower portion; and tightening the screw to clamp the first and second panels.

* * * * *